US010677879B2

(12) United States Patent
Steinhour et al.

(10) Patent No.: US 10,677,879 B2
(45) Date of Patent: Jun. 9, 2020

(54) DEPRESSION ANGLE REFERENCE TRACKING SYSTEM

(71) Applicant: The Boeing Company, Chicago, IL (US)

(72) Inventors: Michael A. Steinhour, St. Louis, MO (US); Ryan A. Howland, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 201 days.

(21) Appl. No.: 15/706,646

(22) Filed: Sep. 15, 2017

(65) Prior Publication Data
US 2019/0086506 A1    Mar. 21, 2019

(51) Int. Cl.
*G01S 3/66* (2006.01)
*G01S 11/04* (2006.01)
(Continued)

(52) U.S. Cl.
CPC ............ *G01S 3/66* (2013.01); *F41G 7/343* (2013.01); *G01C 21/005* (2013.01); *G01C 21/20* (2013.01);
(Continued)

(58) Field of Classification Search
CPC ... G01S 3/66; G01S 11/04; G01S 5/02; G01S 3/14; G06T 7/73; G06T 2207/10032;
(Continued)

(56) References Cited

U.S. PATENT DOCUMENTS

| 3,761,691 A | 9/1973 | Schultz et al. |
| 3,786,505 A * | 1/1974 | Rennie .................. G01C 23/00 342/33 |

(Continued)

FOREIGN PATENT DOCUMENTS

| EP | 2589538 A1 | 5/2013 |
| EP | 3018834 A1 | 5/2016 |
| WO | 2005045991 A1 | 5/2005 |
| WO | 2016/030672 A1 | 3/2016 |

OTHER PUBLICATIONS

Extended European Search Report dated Feb. 12, 2019 in European Patent Application No. 18181465.8 (European counterpart of the instant patent application).

(Continued)

*Primary Examiner* — Vladimir Magloire
*Assistant Examiner* — Michael W Justice
(74) *Attorney, Agent, or Firm* — Ostrager Chong Flaherty & Broitman P.C.

(57) ABSTRACT

Systems and methods for tracking a target depression angle relative to a reference location. In accordance with some embodiments, the system comprises a set of algorithms and pilot displays that use data from an onboard navigation system to calculate an asset's location relative to a reference location, allowing for precise control of relative geometry for the purposes of system measurement and performance assessment. The system provides a pilot with tracking error and steering cues along a flight profile, allowing for closed-loop tracking of target depression angle (body axis elevation) while sweeping look angle (body axis azimuth) relative to a static or dynamic reference location.

17 Claims, 12 Drawing Sheets

(51) Int. Cl.
*G05D 1/06* (2006.01)
*G06T 7/73* (2017.01)
*F41G 7/34* (2006.01)
*G01C 21/00* (2006.01)
*G05D 1/08* (2006.01)
*G01C 21/20* (2006.01)
*G01C 23/00* (2006.01)
*G01S 3/14* (2006.01)
*G01S 5/02* (2010.01)

(52) U.S. Cl.
CPC .............. *G01C 23/005* (2013.01); *G01S 3/14* (2013.01); *G01S 11/04* (2013.01); *G05D 1/0676* (2013.01); *G05D 1/0808* (2013.01); *G06T 7/73* (2017.01); *G01S 5/02* (2013.01); *G06T 2207/10032* (2013.01)

(58) Field of Classification Search
CPC ....... F41G 7/343; G01C 21/005; G01C 21/20; G01C 23/005; G05D 1/0676; G05D 1/0808
See application file for complete search history.

(56) References Cited

U.S. PATENT DOCUMENTS

| | | | |
|---|---|---|---|
| 4,454,496 A * | 6/1984 | Lowe | G01C 23/00 340/951 |
| 4,626,861 A | 12/1986 | Wiley | |
| 4,670,758 A | 6/1987 | Campbell | |
| 7,191,056 B2 | 3/2007 | Costello et al. | |
| 7,965,225 B1 | 6/2011 | Dickerson et al. | |
| 9,146,557 B1 * | 9/2015 | Ahmed | G05D 1/0858 |
| 2010/0228408 A1 * | 9/2010 | Ford | G01C 21/165 701/16 |
| 2015/0081143 A1 * | 3/2015 | Snow | G08G 5/0021 701/16 |

OTHER PUBLICATIONS

Naulais, "General Aviation Radar System for Navigation and Attitude Determination," Master of Science Thesis, Aug. 10, 2015, Faculty of Aerospace Engineering, Delft Univ. of Technology (cited as technical background by EP examiner in European Patent Application No. 18181465.8).

EPO Communication dated Apr. 16, 2020 in European Patent Application No. 18181465.8 (European counterpart of the instant patent application).

* cited by examiner

DEPRESSION ANGLE REFERENCE TRACKING SYSTEM

BACKGROUND

This disclosure generally relates to systems and methods for assessing the performance of a system (e.g., a system having a radiofrequency or optical aperture) installed onboard a sensing aircraft.

As mission requirements push sensing aircraft out to farther stand-off ranges, the need to characterize installed aperture performance is critical for establishing operational capabilities and limitations for onboard communication and sensor systems. Where ground-based testing may prove infeasible due to facility limitations, vehicle scale, or required geometry, airborne testing provides an alternative means of gathering the required data. Current methods of execution for airborne flight profiles involve flying pre-planned trajectories with ground controller-aided maneuvering to track the target depression angle. The ground controller uses an estimate of the test platform's position and attitude to relay maneuvering corrections required to track the target depression angle. The pilot of the airborne test platform responds to the verbal guidance with no explicit onboard feedback of the depression angle tracking error. The primary challenges for existing assessment methods are the limited precision and repeatability in tracking the target depression angle and the limited ability to accommodate disturbances and system constraints in real-time. Latency in ground controller commands to the pilot, lack of onboard tracking error displays, and the challenges in accounting for environmental effects (winds, off-nominal geometry, etc.) are significant factors affecting the data quality of existing solutions. There can be several seconds of time delay in the controller-pilot-aircraft control loop. The ground controller must interpret the estimated vehicle state and issue correction maneuvers based on intuition and experience. After radio relay of corrections, the pilot must interpret and execute the commands smoothly and precisely without the benefit of onboard tracking cues. Without onboard feedback, the pilot has no indication of the magnitude or rate of the depression angle tracking error. The ground controller is generally limited to discrete attitude correction commands and qualitative rate guidance which is insufficient for precise tracking of the target depression angle. The ability to repeat the same trajectory for comparison and validation purposes can also be a challenge. Environmental effects like winds aloft and off-nominal profile setups offer additional challenges, introducing uncertainties that are difficult to accommodate with existing assessment methods. Constraints exist for both the vehicle kinematics (speed, altitude, etc.) and the special test equipment (minimum/maximum range, look rate, cross-polarization angle, etc.). Assessment profiles are pre-planned to avoid constraints to the maximum extent possible. Responding to disturbances in real-time often results in sub-optimal trajectories that reach constraints sooner than planned, resulting in insufficient data.

There is a need to improve data quality and reduce costs when conducting airborne testing to assess installed aperture performance or for field measurement of mission systems.

SUMMARY

The subject matter disclosed in some detail below is directed to systems and methods for tracking a target depression angle relative to a reference location. In accordance with some embodiments, the depression angle reference tracking system comprises a set of algorithms and pilot displays that use data from an onboard Global Positioning System (GPS) and Inertial Navigation System (INS) to calculate a platform's location (i.e., position and orientation) relative to a reference location, allowing for precise control of relative geometry for the purposes of system measurement and performance assessment. The depression angle reference tracking (DART) system provides a pilot with tracking error and steering cues along a flight profile, allowing for closed-loop tracking of target depression angle (body axis elevation) while sweeping look angle (body axis azimuth) relative to a static or dynamic reference location.

The depression angle reference tracking system disclosed in some detail below is designed to improve data quality and reduce costs when conducting airborne testing to assess installed aperture performance or measurement of mission systems. When performing system assessment, the airborne asset is required to fly a trajectory that sweeps look-angle while tracking a target depression angle relative to a reference location. The target depression angle may be either static or dynamic, the latter specified as a function of look-angle. The reference location may be stationary (air-to-ground) or onboard a dynamic platform (air-to-air). As the airborne test platform flies a given trajectory, a set of look and depression angles are presented to the reference location, allowing specialized test equipment (at the reference location) to assess system performance for specific aspect angles on the test platform. In addition to depression angle tracking requirements, the test platform must also satisfy certain geometric and kinematic constraints for data quality and safety considerations. Precise control of relative geometry is critical in tracking the desired depression angles with sufficient accuracy for data quality. The system disclosed herein is designed to provide onboard capabilities for precise depression angle tracking while considering constraints of the system.

The depression angle reference tracking system disclosed herein provides three options to improve depression angle tracking performance, which options are referred to herein as Error Cue (Tier 1), Blended Flight Director (Tier 2) and Advanced Flight Director (Tier 3), respectively.

In accordance with one embodiment of the Error Cue system, a depression angle error cue is displayed to the pilot, providing an indication of tracking error magnitude and rate with intuitive cues for maneuvers required to null tracking error. The error cue provides situational awareness, previously unavailable to the pilot, allowing for smooth tracking of the target depression angle.

In accordance with one embodiment of the Blended Flight Director, an Instrument Landing System (ILS)-style flight director provides pitch and roll command guidance to fly a trajectory which tracks the target depression angle. Flight profiles can be designed to use single or multi-axis commands to track the target depression angle while maximizing swept look-angle and minimizing exposure to kinematic and system constraints. The Blended Flight Director concept avoids constraints where possible by balancing pitch and roll commands as the flight profile evolves.

In accordance with one embodiment of the Advanced Flight Director, the ILS-style flight director from the Blended Flight Director is reused. In addition, the Advanced Flight Director allows for execution of flight profiles designed and optimized using a Model Predictive Control (MPC) construct. Flight profiles designed and executed using MPC allow for continuous optimization of the trajectory, maximizing efficiency (swept look angle), while explicitly honoring kinematic and system constraints, simultaneously operating in the presence of environmental disturbances and off-nominal conditions. The flight director capabilities of the Blended and Advanced Flight Directors enable closed-loop guidance when integrated with an autopilot system, allowing for autonomous execution on manned and unmanned platforms.

Relative to existing methods, the depression angle reference tracking system disclosed herein can be used to achieve the following: (a) increased accuracy (e.g., smaller mean tracking errors); (b) increased precision (e.g., less variation around the target depression angle); (c) increased repeatability (e.g., the flight directors define explicit trajectories, allowing for repeatable data in similar environmental conditions); (d) increased robustness (e.g., the tracking error guidance is insensitive to winds and off-nominal conditions); and (e) increased flexibility (e.g., provides an invaluable capability for applications requiring precise relative geometries).

Although various embodiments of systems and methods for tracking a target depression angle relative to a reference location will be described in some detail below, one or more of those embodiments may be characterized by one or more of the following aspects.

One aspect of the subject matter disclosed in some detail below is a system for displaying an indicator that indicates a magnitude of a depression angle error to a pilot of an aircraft, comprising a display unit having a display screen and a computer system configured to control the display unit which displays an error cue having a position on the display screen which is a function of a deviation of a current depression angle of the aircraft from a target depression angle. In accordance with one embodiment, the computer system is further configured to calculate the current depression angle of the aircraft relative to a reference location using data representing a location of the aircraft relative to the reference location. In some cases, the target depression angle varies as a function of a look angle. In addition, the computer system may be further configured to control the display unit to display at least portions of a reference line, wherein the first symbol is centered on the reference line when the depression angle error is zero.

Another aspect of the subject matter disclosed in some detail below is a method for displaying an indicator that indicates a magnitude of a depression angle error to a pilot of an aircraft, comprising: calculating a deviation of a current depression angle from a target depression angle; and displaying an error cue on a display screen of a display unit, which error cue has a position which is a function of the deviation of the current depression angle from the target depression angle. This method may further comprise: displaying a reference line on the display screen corresponding to a deviation equal to zero; viewing the display screen as the error cue and the reference line are being displayed; and manipulating a primary cockpit flight control input device in a manner that causes the error cue to move closer to the reference line, wherein the depression angle error is zero when the error cue is centered on the reference line. This method may further comprise calculating the current depression angle of the aircraft relative to a reference location using data representing a location of the aircraft relative to the reference location. In some cases, the target depression angle may be a function of a look angle.

A further aspect of the subject matter disclosed in some detail below is a system for displaying visual cues for pilot guidance during flight of an aircraft, comprising a display unit having a display screen and a computer system configured to perform the following operations: (a) calculate optimal roll and pitch steering commands that satisfy the condition that a deviation of a current depression angle from a target depression angle equals zero; (b) calculate roll and pitch angle errors representing respective deviations of current roll and pitch steering commands from the optimal roll and pitch steering commands; and (c) control the display unit to display roll and pitch error bars on the display screen, wherein the positions of the roll and pitch error bars are respective functions of the calculated roll and pitch angle errors. The target depression angle varies as a function of a look angle. Optionally, the computer system may be further configured to perform an autopilot function that is driven by the calculated roll and pitch angle errors.

In accordance with one embodiment of the system described in the preceding paragraph, the computer system is further configured to calculate the optimal roll and pitch steering commands by executing the following operations: calculating a location unit vector that points from an aircraft location to a reference location; retrieving data specifying a target depression angle as a function of a look angle; solving for a target Z-component of a body axis unit vector as a function of the target depression angle; creating a set of candidate solutions for roll and pitch steering commands that satisfy a command equation in which the target Z-component of the body axis unit vector is a transcendental function of at least the location unit vector and the roll and pitch steering commands; and using a cost function to select the optimal roll and pitch steering commands from the set of candidate solutions. In one proposed implementation, the computer system performs a linearization of constraints using the cost function to blend the optimal roll and pitch steering commands.

In accordance with another embodiment of the system for displaying visual cues for pilot guidance, the optimal roll and pitch steering commands are calculated using a Model Predictive Control approach for real-time trajectory optimization while honoring constraints.

Yet another aspect of the subject matter disclosed herein is a method for providing guidance to enable a pilot flying an aircraft to track a target depression angle, comprising: calculating optimal roll and pitch steering commands that satisfy the condition that a deviation of a current depression angle from a target depression angle equals zero; calculating roll and pitch angle errors representing respective deviations of current roll and pitch steering commands from the optimal roll and pitch steering commands; and displaying roll and pitch error bars on a display screen of a display unit, wherein the positions of the roll and pitch error bars are respective functions of the calculated roll and pitch angle errors.

Other aspects of systems and methods for tracking a target depression angle relative to a reference location are disclosed below.

BRIEF DESCRIPTION OF THE DRAWINGS

The features, functions and advantages discussed in the preceding section can be achieved independently in various embodiments or may be combined in yet other embodiments. Various embodiments will be hereinafter described with reference to drawings for the purpose of illustrating the above-described and other aspects. None of the diagrams briefly described in this section are drawn to scale.

Reference will hereinafter be made to the drawings in which similar elements in different drawings bear the same reference numerals.

DETAILED DESCRIPTION

For the purpose of illustration, systems and methods for tracking a target depression angle relative to a reference location will now be described in some detail. However, not all features of an actual implementation are described in this specification. A person skilled in the art will appreciate that in the development of any such embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

One embodiment of a depression angle reference tracking (DART) system will now be described with reference to a sensing aircraft for the purpose of illustration. An on-board error cue and flight director enables precise depression angle tracking for platform system testing. The system is capable of tracking constant or variable depression angles relative to a fixed reference point or relative to a dynamic reference point (e.g., air-to-air). This depression angle reference tracking (DART) system comprises a set of algorithms and pilot displays that use data from an onboard GPS and INS to calculate the aircraft's location relative to a fixed or moving reference location, allowing for precise control of relative geometry for the purposes of system measurement and performance assessment.

Figure 1:
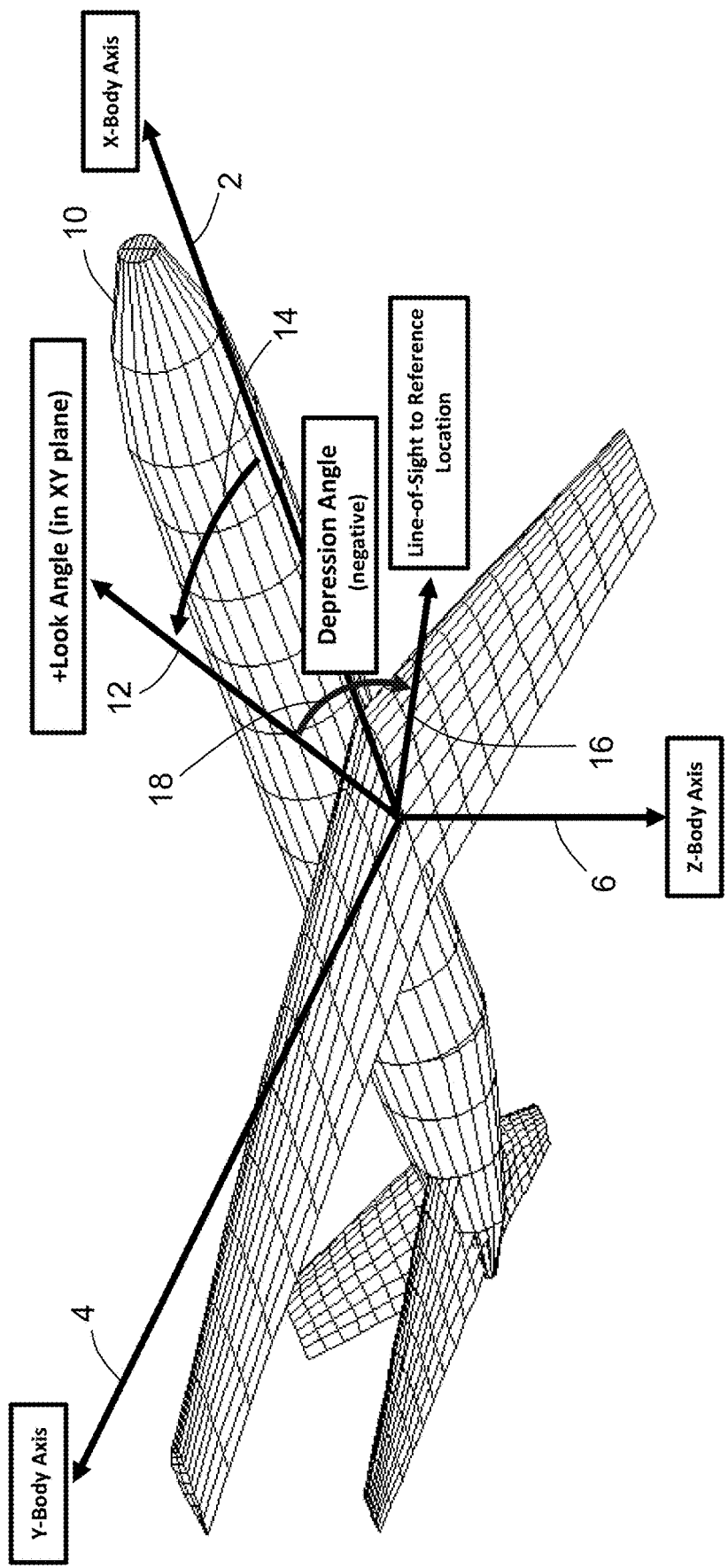
FIG. 1 is a diagram defining the look angle and depression angle relative to a frame of reference of the body of an aircraft.

FIG. 1 is a diagram defining the look angle and depression angle relative to a frame of reference of an aircraft having a body 10. The frame of reference of the aircraft comprises an X-body axis 2, a Y-body axis 4 and a Z-body axis 6, which body axes (indicated by arrows) are mutually orthogonal. The look angle (indicated by curved arrow 14) is defined as the body axis azimuth angle, i.e., the angle measured between the look angle vector 12 and the X-body axis 2, which is measured rotating around the Z-axis in the XY-plane (waterline). The look angle is positive from the X-axis in a right-handed coordinate system. The depression angle (indicated by curved arrow 18) is defined as the body axis elevation angle, i.e., the angle measured between the line-of-sight vector 16 (pointing at the reference location) and the XY-plane. The depression angle is negative below the aircraft waterline.

Figure 2:
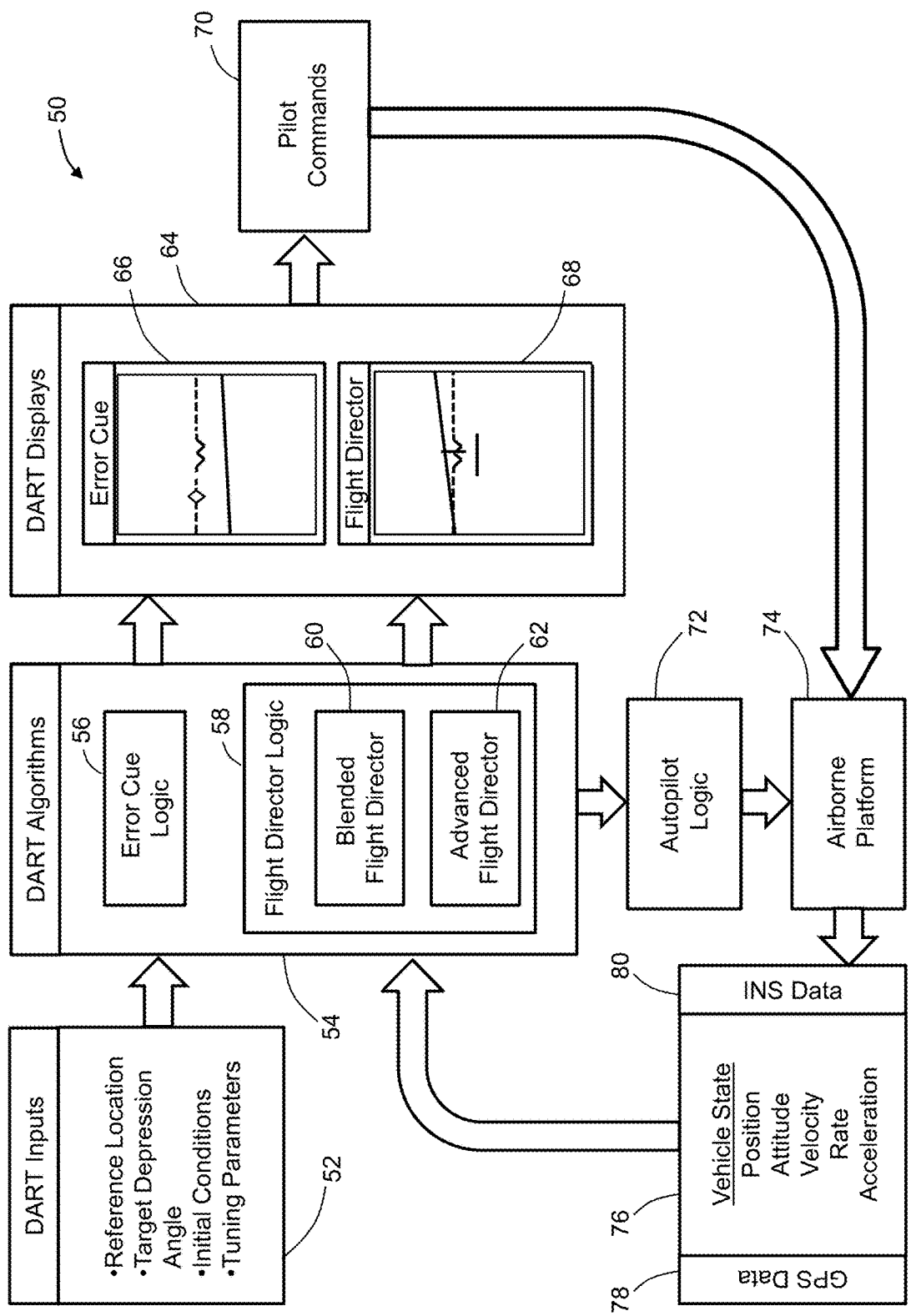
FIG. 2 is a flowchart identifying software (including algorithms and data inputs to those algorithms) and hardware components of a depression angle reference tracking (DART) system in accordance with one embodiment.

FIG. 2 is a flowchart identifying software (including algorithms and data inputs to those algorithms) and hardware components of a depression angle reference tracking system 50 in accordance with one embodiment. This depression angle reference tracking system 50 comprises one or more computers that are configured to perform a plurality of depression angle reference tracking algorithms 54 (hereinafter "DART algorithms 54"). All of the DART algorithm functionality (error cue processing, flight director calculations, etc.) could be hosted on a wide range of onboard computing systems. Different airborne platforms will have different computing system architectures. For example, the DART algorithm functionality could be hosted on an integrated flight computer, a mission computer, a display processor, or external computing and display hardware that is not an original part of a platform's existing flight/mission systems architecture (provided that the external hardware has access to precise position and attitude data from the platform).

The depression angle reference tracking algorithms can be implemented in three tiers of increasing capability: error cue logic 56 and flight director logic 58 comprising a Blended Flight Director 60 and an Advanced Flight Director 62. The error cue logic 56 (Tier 1) provides feedback of depression angle tracking error and rate, enabling the pilot to prioritize pitch and roll inputs with error cue positions displayed on the screen of an error cue primary flight display 66 of a depression angle reference tracking display system 64 (hereinafter "DART display system 64"). The Blended Flight Director 60 (Tier 2) provides command guidance for blended pitch/roll commands using an Instrument Landing System (ILS) style pilot interface displayed on the screen of a flight director primary flight display 68 of the DART display system 64, enabling a pilot to fly smooth and repeatable trajectories while avoiding constraints. In the alternative, the Advanced Flight Director 62 (Tier 3) provides pitch/roll command guidance using an ILS style interface which is displayed on the screen of the flight director primary flight display 68. The Advanced Flight Director 62 has a Model Predictive Control architecture which is configured to provide optimized guidance for maximized test efficiency and real-time avoidance of system and kinematic constraints.

The inputs to the DART algorithms comprise DART inputs 52, including but not limited to reference location, target depression angle, initial conditions and tuning parameters, as well as vehicle state information 76 such as position, attitude, velocity, rate (e.g., roll rate) and acceleration. This vehicle state information can be derived from GPS data 78 and INS data 80. The GPS data 78 and INS data 80 are respectively acquired by a GPS and an INS (not shown in FIG. 2) during flight of the airborne platform 74. The flight of the airborne platform 74 is dictated by either pilot commands 70 input by the pilot as he/she views the cues and/or guidance displayed on the DART display system 64 or by commands issued by autopilot logic 72 in response to depression angle tracking error information received from the flight director logic 58.

Figure 4:
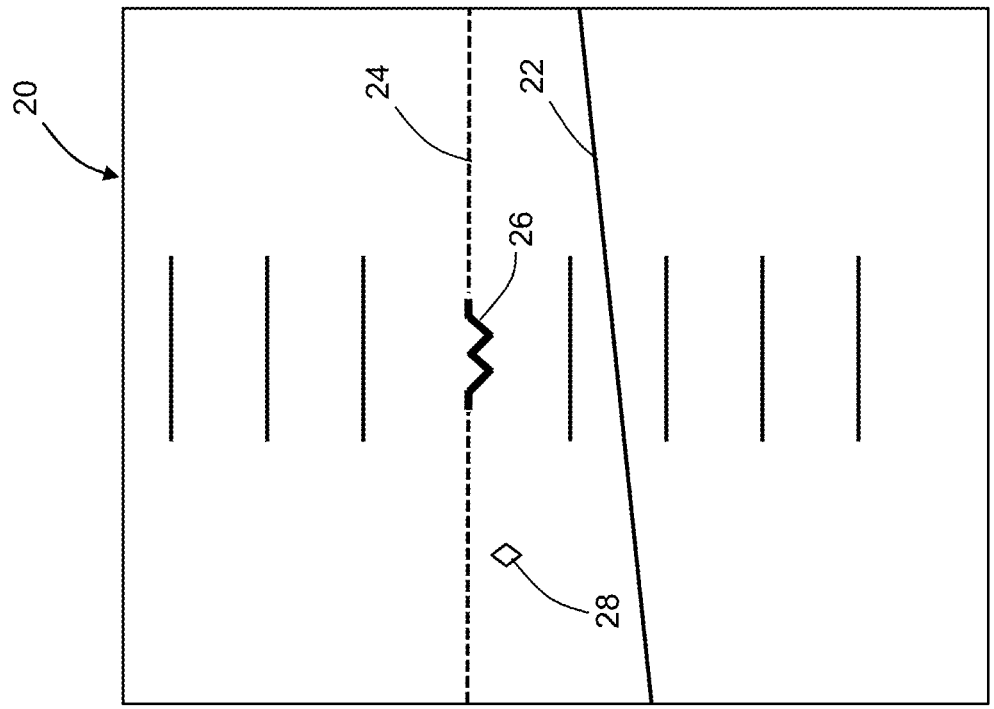
FIGS. 3 and 4 are diagrams representing respective screenshots from a display unit that is displaying an aircraft symbol, a horizon line and symbology representing a depression angle tracking error when the magnitude of the error is zero (FIG. 3) and non-zero (FIG. 4).
Figure 3:
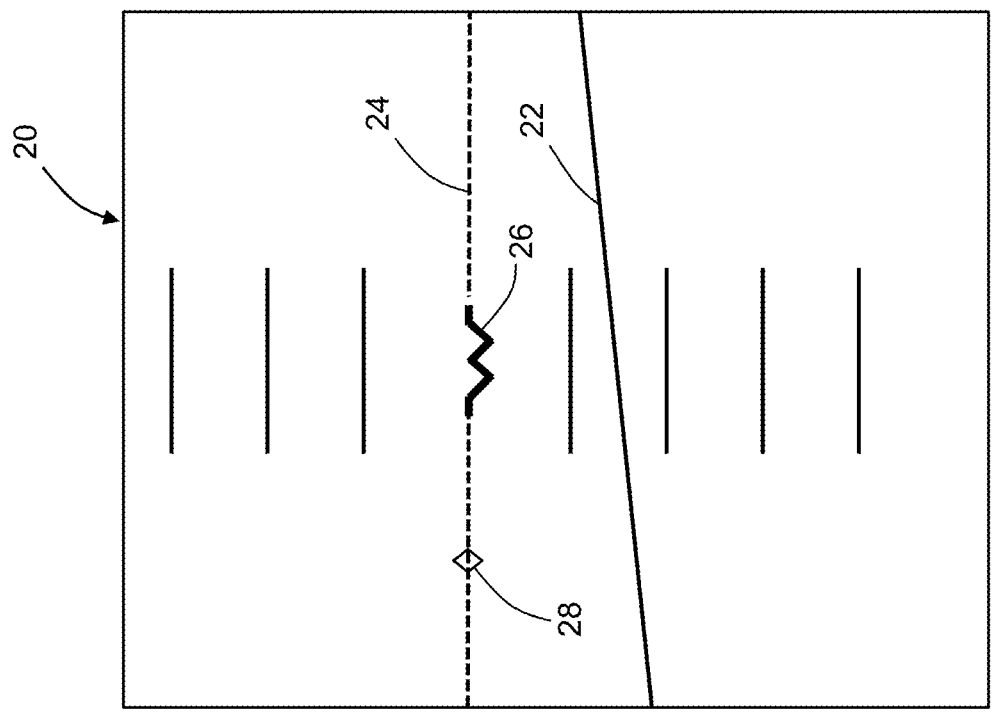

FIGS. 3 and 4 are diagrams representing respective screenshots of a notional primary flight display 20 that is displaying an aircraft symbol 26, a horizon line 22 and an error cue 28 when the system is operating in the Error Cue mode. The vertical position of the error cue indicates any depression angle tracking error, thereby enabling the pilot to maneuver the aircraft for correcting the error. In the primary flight display 20, the aircraft symbol 26 has a fixed position, while the horizon line 22 moves up/down or rotates clockwise/counterclockwise as the location of the airborne platform 74 changes relative to the horizon.

In accordance with the implementation depicted in FIGS. 3 and 4, the lateral offset of the error cue 28 is proportional to the look angle (i.e., body axis azimuth) of the airborne platform 74, while the vertical offset of the error cue 28 indicates the depression angle tracking error. More specifically, the magnitude of the depression angle tracking error (normalized to 0° depression angle) is indicated by the vertical distance of the error cue 28 from a zero error reference line 24 (indicated by dashes) that extends from opposite ends of the aircraft symbol 26. In the example depicted in FIG. 3, the magnitude of the depression angle tracking error is zero, as indicated by the alignment of error cue 28 with zero error reference line 24. In the example depicted in FIG. 4, the magnitude of the depression angle tracking error is non-zero, as indicated by the vertical separation distance between error cue 28 and zero error reference line 24. More specifically, the position of the error cue 28 in FIG. 4 provides guidance for the pilot to maneuver the aircraft to reduce the tracking error by pitching down and rolling left. To track a target depression angle, the pilot maneuvers the aircraft to keep the error cue 28 on (i.e., aligned with) the zero error reference line 24, as shown in FIG. 3.

Figure 5:
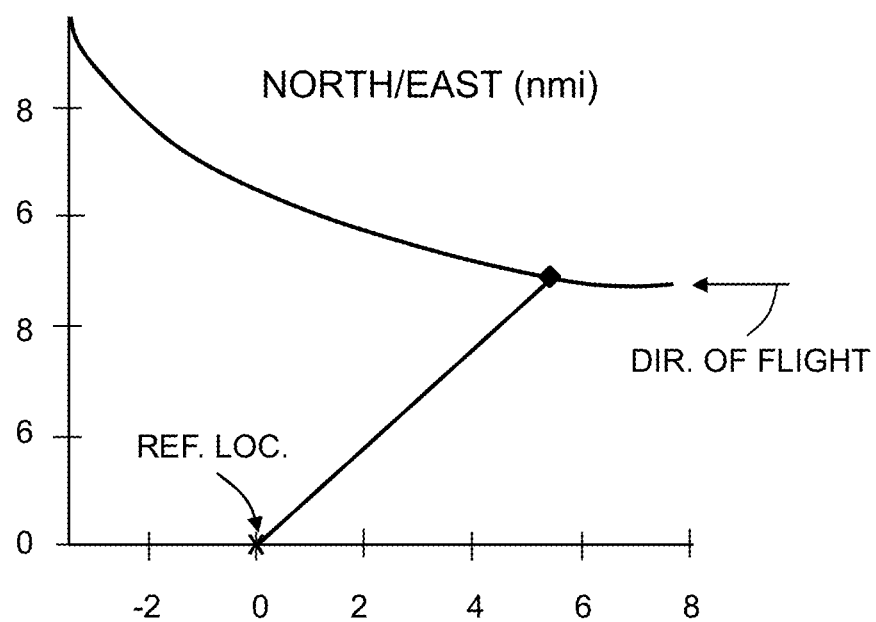
FIG. 5 is a two-dimensional graph showing one example of a flight path of an aircraft relative to a fixed reference location having coordinates (0, 0). The arrow indicates the direction of flight, while the straight line indicates the line-of-sight from the aircraft to the reference location when the aircraft is located at the position indicated by the solid diamond.
Figure 5A:
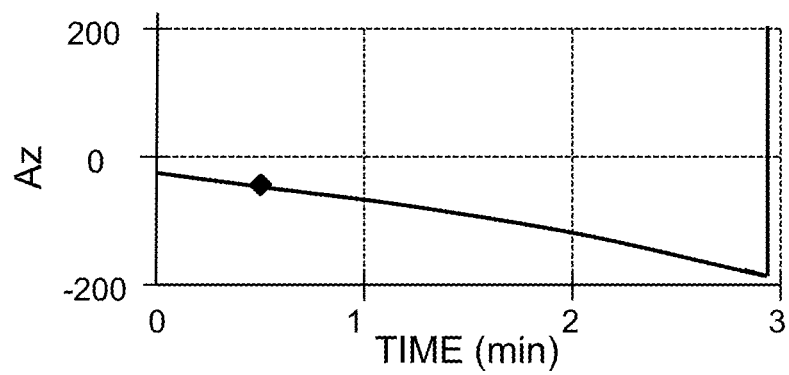
FIGS. 5A and 5B are graphs of look angle (a.k.a. azimuth angle) and depression angle (a.k.a. elevation angle) respectively versus time during flight of an aircraft along the path depicted in FIG. 5.
Figure 5B:
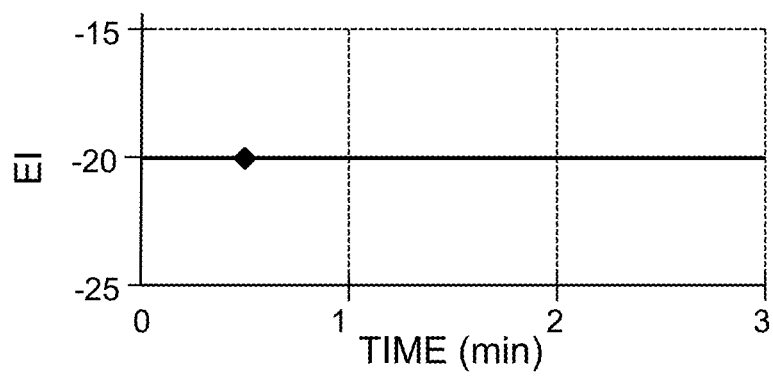

FIG. 5 is a two-dimensional graph showing one example of a simulated flight path of an aircraft relative to a fixed reference location having coordinates (0, 0). The arrow indicates the direction of flight, while the straight line indicates the line-of-sight from the aircraft to the reference location when the aircraft is located at the position indicated by the solid diamond. FIG. 5A is a graph of look angle (Azimuth) versus time during flight of the aircraft along the path depicted in FIG. 5. FIG. 5B is a graph of depression angle (Elevation) versus time during flight of the aircraft along the path depicted in FIG. 5. FIG. 5B indicates that during the simulation, a target depression angle of −20° was maintained for three minutes while the look angle was swept over a range from about −30° to about −180°.

Figure 7:
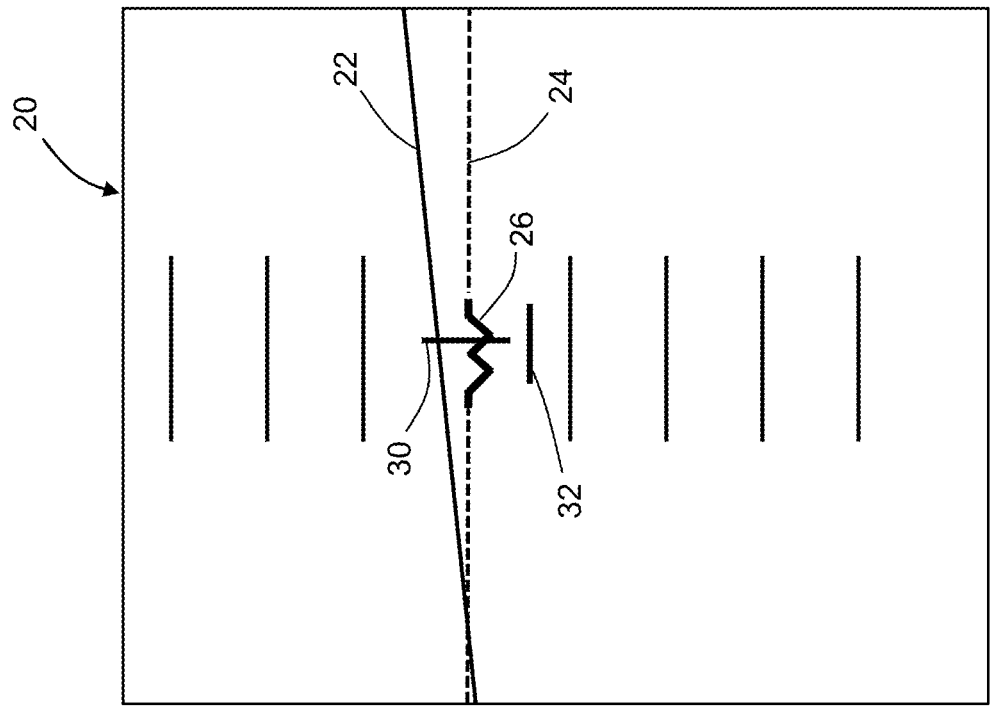
FIGS. 6 and 7 are diagrams representing respective screenshots from a display unit that is displaying an aircraft symbol, a horizon line, a roll angle error bar and a pitch angle error bar when the magnitude of the error is zero (FIG. 6) and non-zero (FIG. 7).
Figure 6:
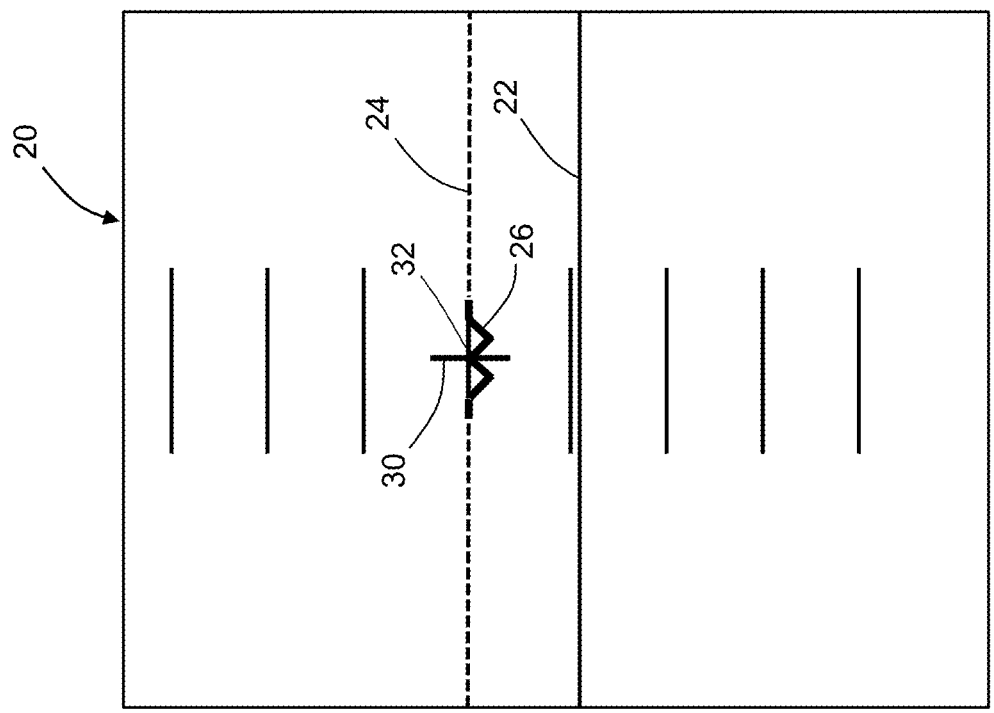

FIGS. 6 and 7 are diagrams representing respective screenshots of a notional primary flight display 20 when the system is operating in the Blended Flight Director mode. The primary flight display 20 is displaying an aircraft symbol 26, a horizon line 22, a roll angle error bar 30 and a pitch angle error bar 32 when the magnitude of the depression angle tracking error is zero (FIG. 5) and non-zero (FIG. 6) respectively. In the primary flight display 20, again the aircraft symbol 26 has a fixed position, while the horizon line 22 moves up/down or rotates clockwise/counterclockwise as the location of the airborne platform 74 changes relative to the horizon. The center vertex of the aircraft symbol 26 represents an aircraft boresight corresponding to a centered flight director command. The Blended Flight Director provides pitch and roll command guidance to track depression angle. Accordingly, display equipment on board the aircraft is configured to generate the display of graphical indicators for indicating the calculated roll and pitch angle errors relative to a displayed aircraft symbol. The display computer on board the aircraft may be associated with the integrated flight computer on board the aircraft, and may be configured to generate the display of the graphical indicators that are overlaid on a flight display relative to the displayed aircraft symbol. For example, the display computer may generate the display of graphical indicators for the calculated roll and pitch angle errors that may be overlaid relative to an aircraft symbol using an instrument landing system (ILS) style of pilot interface on a primary flight display of the aircraft. The display equipment therefore controls the display and/or overlay of graphical indicators such as roll and pitch error bars, where the positions of the roll and pitch error bars are respective functions of the calculated roll and pitch angle errors, to thereby enable a pilot to precisely control the aircraft to follow a trajectory that sweeps look angle while tracking a target depression angle relative to a reference location on the ground.

In accordance with the implementation depicted in FIG. 7, the roll angle error bar 30 and pitch angle error bar 32 indicate the direction of correction commands. The pilot is able to follow the roll angle error bar 30 for roll cues and follow the pitch angle error bar 32 for pitch cues. To track a target depression angle, the pilot maneuvers the aircraft in accordance with the roll and pitch cues until the roll angle error bar 30 and pitch angle error bar 32 both intersect at the aircraft boresight (as seen in FIG. 6), indicating that the magnitude of the depression angle tracking error has become zero.

Figure 8:
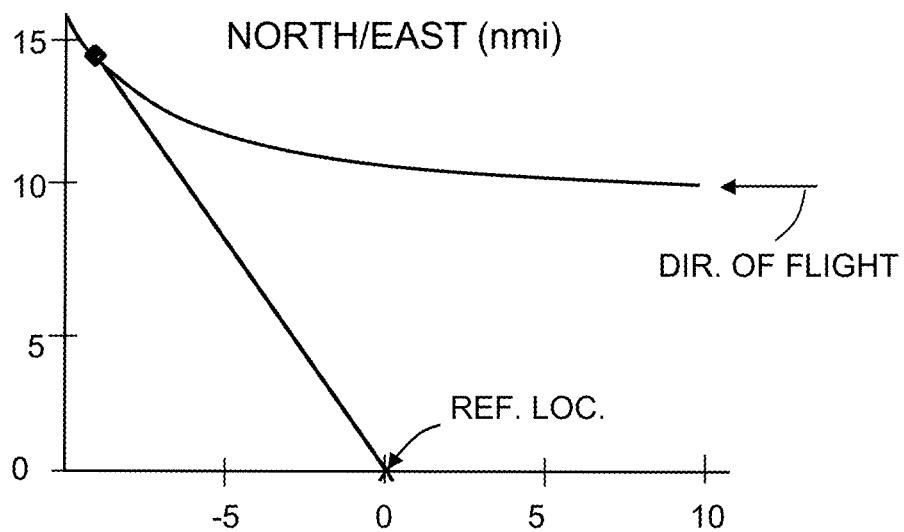
FIG. 8 is a two-dimensional graph showing another example of a flight path of an aircraft relative to a fixed reference location having coordinates (0, 0). The arrow indicates the direction of flight, while the straight line indicates the line-of-sight from the aircraft to the reference location when the aircraft is located at the position indicated by the solid diamond.
Figure 8A:
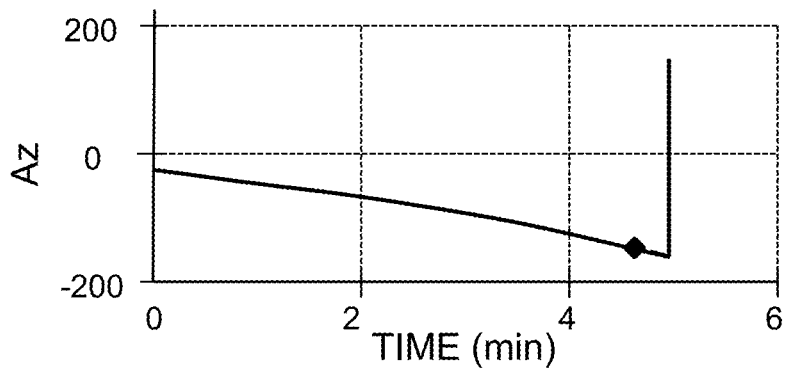
FIGS. 8A and 8B are graphs of look angle and depression angle respectively versus time during flight of an aircraft along the path depicted in FIG. 8.
Figure 8B:
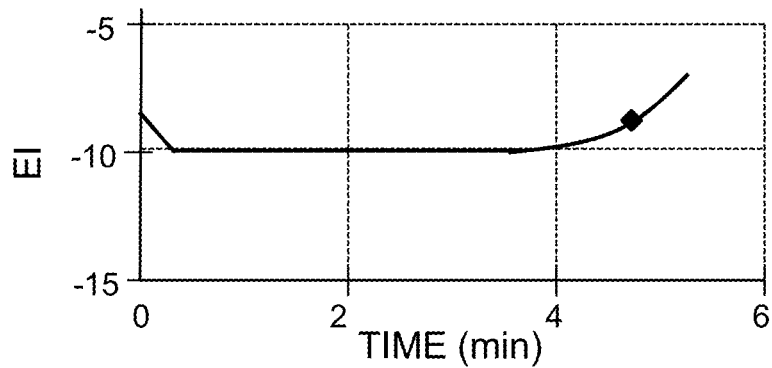

FIG. 8 is a two-dimensional graph showing another example of a simulated flight path of an aircraft relative to a fixed reference location having coordinates (0, 0). The arrow indicates the direction of flight, while the straight line indicates the line-of-sight from the aircraft to the reference location when the aircraft is located at the position indicated by the solid diamond. FIG. 8A is a graph of look angle versus time during flight of the aircraft along the path depicted in FIG. 8. FIG. 8B is a graph of depression angle versus time during flight of the aircraft along the path depicted in FIG. 8. FIG. 8B indicates that during the simulation, a target depression angle of −10° was maintained for almost four minutes while the look angle was swept over a range from about −40° to about −180°.

Figure 9:
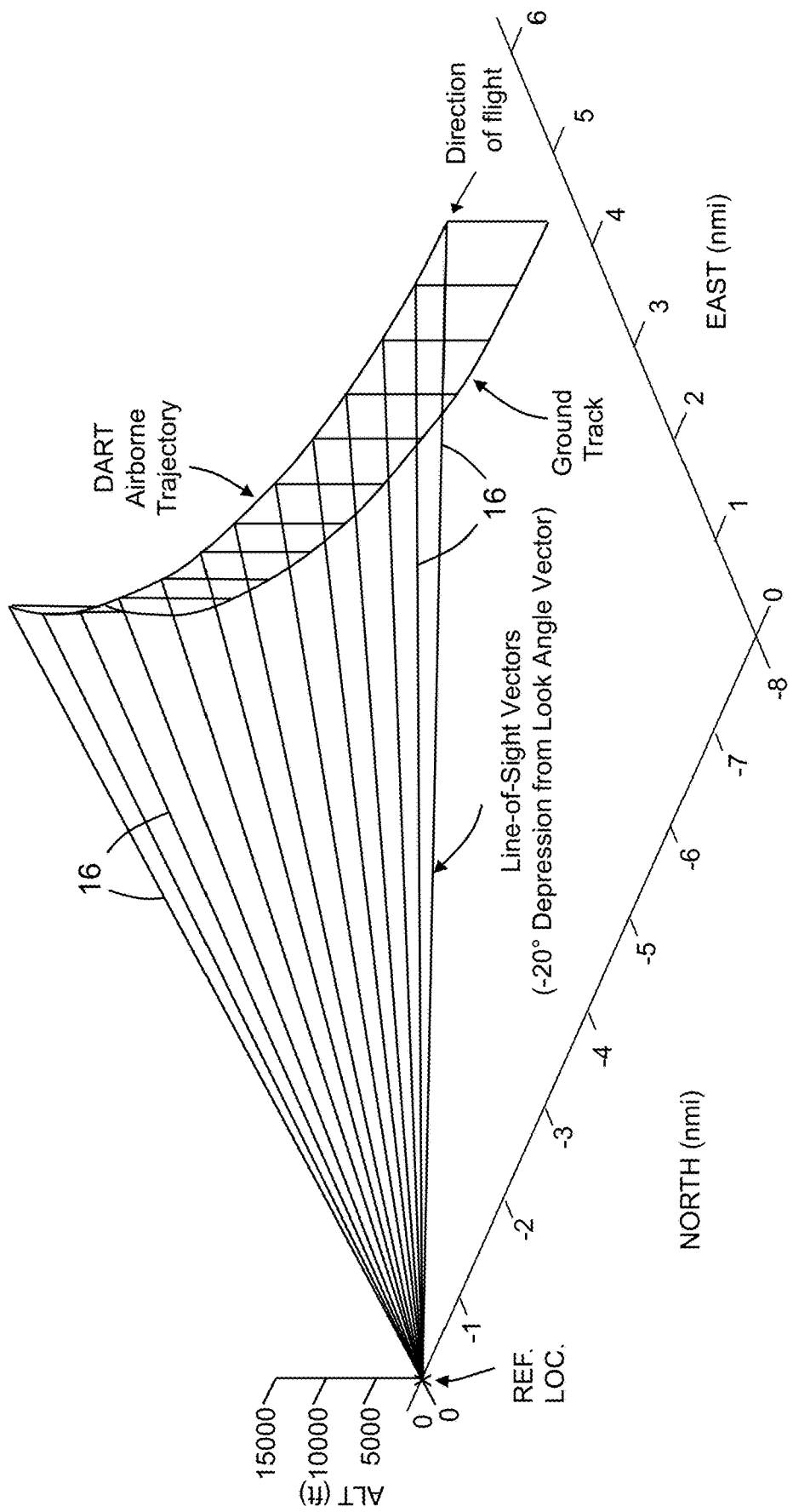
FIG. 9 is a three-dimensional graph showing an example of a variable-altitude flight trajectory of an aircraft relative to a fixed reference location having coordinates (0, 0, 0) for a case wherein the target depression angle is −20°.
Figure 9A:
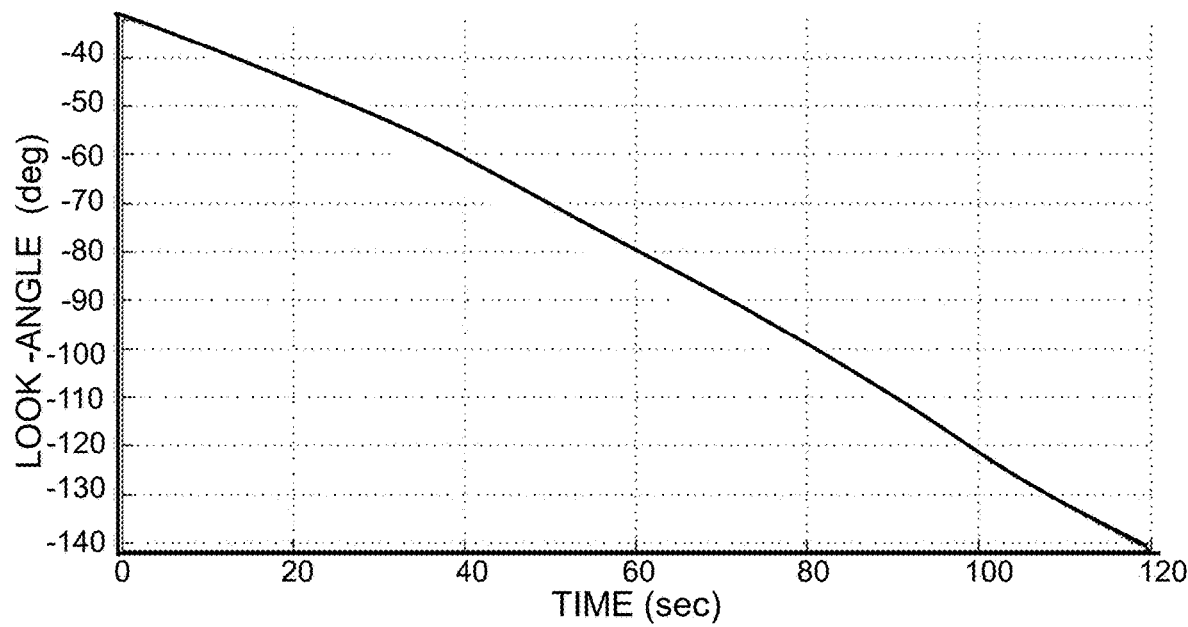
FIGS. 9A through 9D are graphs of look angle, depression angle, pitch angle and roll angle respectively versus time during flight of an aircraft along the example trajectory depicted in FIG. 9.
Figure 9B:
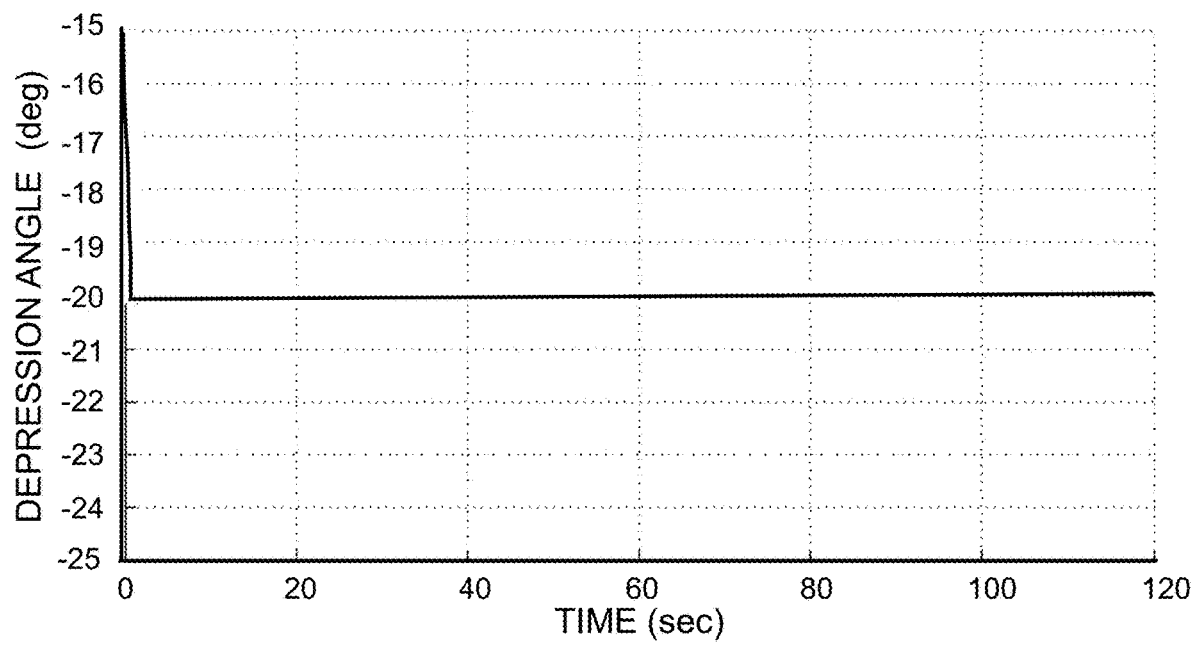
Figure 9C:
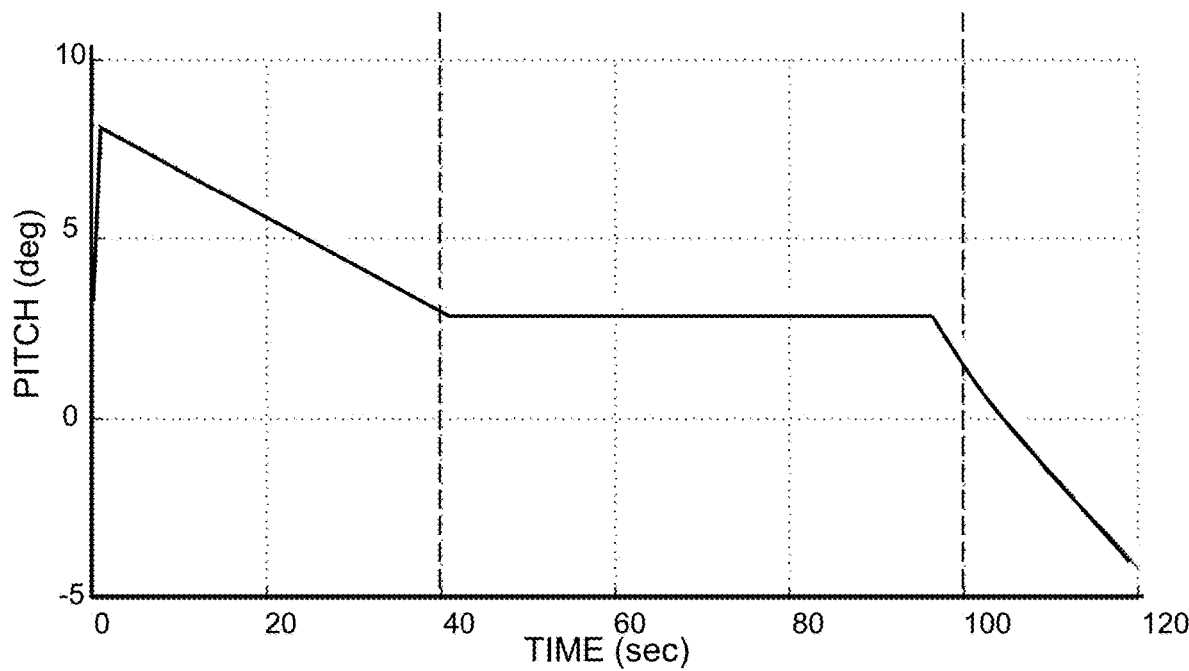
Figure 9D:
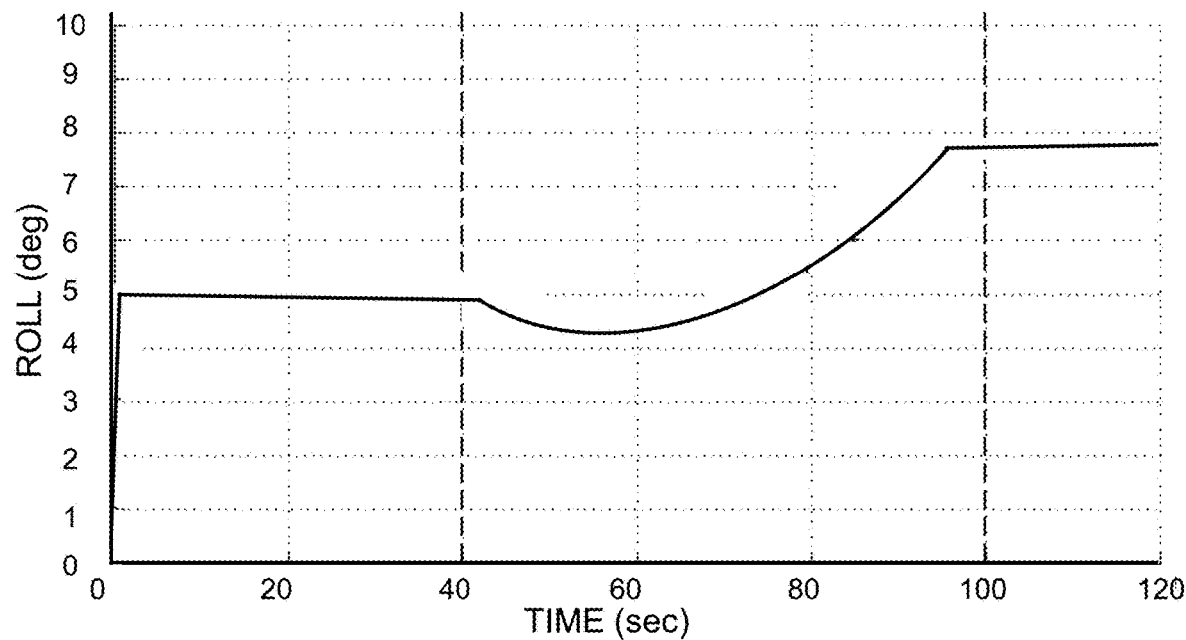

FIG. 9 is a three-dimensional graph showing an example of a simulated variable-altitude flight trajectory of an aircraft relative to a fixed reference location having coordinates (0, 0, 0). The target depression angle was maintained at −20°, meaning that each of the line-of-sight vectors depicted in FIG. 9 makes an angle of −20° relative to the respective look angle vector (not shown in FIG. 9).

FIGS. 9A through 9D are graphs of look angle, depression angle, pitch angle and roll angle respectively versus time during flight of an aircraft along the example trajectory depicted in FIG. 9 for a simulated time of two minutes. The data presented in these graphs was generated during a simulation of a Blended Flight Director configured to maintain a target depression angle of −20° while operating with one fixed axis and one free axis. During the first 40 seconds, the pitch axis was free (see FIG. 9C) and the roll axis was fixed (see FIG. 9D); during the next 55 seconds, the pitch axis was fixed (see FIG. 9C) and the roll axis was free (see FIG. 9D); and during the last 25 seconds, the pitch axis was (see FIG. 9C) and the roll axis was fixed (see FIG. 9C). The aircraft tracked the −20° depression angle for two minutes (see FIG. 9B), during which time span the look angle was swept over a range from about −30° to about −140° (see FIG. 9A).

In summary, in response to data received from error cue processing module, a display computer controls a primary flight display to display the symbology depicted in FIGS. 3 and 4, while in response to data received from an auto-pilot flight director, the display computer controls the primary flight display to display the symbology depicted in FIGS. 6 and 7. In the example shown in FIGS. 6 and 7, the primary flight display graphically depicts the aircraft attitude relative to the horizon (by means of the fixed aircraft symbol 26 and moving horizon line 22), a roll angle error bar 30 and a pitch angle error bar 32. The displayed information dynamically changes in response to changes in aircraft parameter values.

In accordance with one embodiment, the error cue logic 56 (see FIG. 2) comprises a function $f_{br}$ that creates a body reference vector ($\vec{r}$) by mapping platform and reference states into a vector pointing from the platform to the reference location, relative to the platform body axes:

$$\vec{r} = f_{br}(x)$$

The state vector (x) contains platform Latitude, Longitude, Altitude, & Attitude ($\phi$, $\theta$, $\psi$) as well as reference location Latitude, Longitude, & Altitude:

$$x = [LLA_p, ATT_p, LLA_{ref}, \ldots]$$

The state (x) may be augmented with other parameters as required.

The error cue logic 56 further comprises a function $f_{\lambda\delta}$ that calculates look ($\lambda$) and depression ($\delta$) angles using the body reference vector ($\vec{r}$), where $\lambda \in [-180°, 180°]$ and $\delta \in [-90°, 90°]$:

$$[\lambda, \delta] = f_{\lambda\delta}(\vec{r})$$

The DART system can be configured by the user so that the target depression angle $\delta_T$ is a user-defined function $f_T$ of the look angle $\lambda$:

$$\delta_T = f_T(\lambda)$$

The depression angle error ($\varepsilon$) is defined as $\delta - \delta_T$:

$$\varepsilon = \delta - \delta_T$$

The error cue logic 56 further comprises a function $f_{EC}$ that maps look angle and depression angle error into error cue position [$EC_\lambda$, $EC_\varepsilon$] to be displayed to pilot:

$$[EC_\lambda, EC_\varepsilon] = f_{EC}(\lambda, \varepsilon)$$

The $EC_\lambda$ term defines the lateral position of the error cue, normalized to ±1. The $EC_\varepsilon$ term defines the vertical position of the error cue.

In accordance with one possible implementation, the details of the function mapping look angle and depression angle error onto the pilot's display are as follows:

| function [$EC_\lambda$, $EC_\varepsilon$] = $f_{EC}(\lambda, \varepsilon)$ |
|---|
| if \|λ\| ≤ 90 |
|     $EC_s = \varepsilon$ |
|     $EC_\lambda = \lambda/90$ |
| else |
|     $EC_s = -\varepsilon$ |
|     if λ ≥ 0 |
|         $EC_\lambda = (\lambda - 180)/90$ |
|     else |
|         $EC_\lambda = (180 + \lambda)/90$ |
|     end |
| end |

Functions defined for the Error Cue mode are used as required in the logic for the Blended Flight Director 60 (see FIG. 2).

In accordance with one embodiment, the logic for the Blended Flight Director 60 further comprises a command function $f_{cmd}$ that relies on user selection of initial conditions and an a priori definition of a pitch or roll profile to minimize exposure to constraints. Real-time constraint avoidance is not performed. The command function $f_{cmd}$ calculates the roll ($\phi_C$) and pitch ($\theta_C$) commands to satisfy the target depression angle tracking requirements, $\varepsilon = \delta - \delta_T = 0$:

$$[\phi_C, \theta_C] = f_{cmd}(x, \delta_T, \phi_F, \theta_F)$$

This formulation is a nonlinear function of state (x), target depression angle ($\delta_T$), and optional arguments ($\phi_F$, $\theta_F$) that allow the user to fix a specific $\phi$ or $\theta$ value to follow a desired roll or pitch profile, respectively, where the state is given by the following equation:

$$x = [\ldots, \phi, \theta, \psi, \ldots], \text{roll,pitch,yaw}$$

In accordance with another embodiment, the logic for the Blended Flight Director 60 comprises a command function $f_{cmd}$ that incorporates details of the constraints in addition to the state and target depression angle. While user selection of initial conditions is still important, this implementation performs a linearization of the constraints to blend the roll and pitch commands, minimizing exposure to constraints. This command function $f_{cmd}$ calculates the roll ($\phi_C$) and pitch ($\theta_C$) commands to satisfy the target depression angle tracking requirements, $\varepsilon = \delta - \delta_T = 0$:

$$[\phi_C, \theta_C] = f_{cmd}(x, \delta_T, g(x, \mathcal{Y})),$$

where $$\mathcal{Y} = \hbar_{out}(x)$$

The nonlinear output function $\hbar_{out}$ maps state variables into system performance parameters such as (range, speed, look rate, cross polarization angle, etc.). Using system state (x) and output variable ($\mathcal{Y}$), the function g(x, $\mathcal{Y}$) defines constraints that the trajectory must honor for profile validity. Roll ($\phi_C$) and pitch ($\theta_C$) commands are calculated to avoid violating constraints to the maximum possible extent.

The logic for the Blended Flight Director 60 further comprises a mapping function $f_{FD}$ that calculates roll and pitch error signals to display to the pilot. These error signals can also be used to drive an autopilot system on a manned or unmanned platform. The mapping function $f_{FD}$ maps roll and pitch angle error into flight director error bar positions ($FD_\phi$, $FD_\theta$) to be displayed to pilot:

$$[FD_\phi, FD_\theta] = f_{FD}(\phi_C, \theta_C, x)$$

The $FD_\phi$ term defines the roll error bar position. The $FD_\theta$ term defines the pitch error bar position.

Functions defined for the Error Cue mode are also used as required in the logic for the Advanced Flight Director 62 (see FIG. 2). For maximum efficiency, the ability to generate a trajectory with maximum swept look angle ($\Delta\lambda$) is desired. The swept look angle is defined as $|\lambda_N - \lambda_0|$ resolved to the range [0°,360°], where the subscript 0 denotes the initial time and N represents the end of the profile. Model Predictive Control (MPC) represents a broad class of control algorithms that allow for the explicit accommodation of system constraints in the solution of closed-loop control and trajectory generation problems. Creating optimized trajectories for the depression angle tracking problem will involve a non-linear variant of the MPC controller design to ensure that complex constraints are avoided for as long as possible while maximizing the swept look angle.

In accordance with one embodiment, the logic for the Advanced Flight Director 62 further comprises a command function $f_{cmd}$ that calculates the roll ($\phi_C$) and pitch ($\theta_C$) commands to satisfy the target depression angle tracking requirements $\varepsilon = \delta - \delta_T = 0$ using a MPC approach for real-time trajectory optimization while honoring constraints.

$$[\phi_C, \theta_C] = f_{mpc}(x, \delta_T, g(x, \mathcal{Y}), w)$$

This formulation is a nonlinear function of state (x), target depression angle ($\delta_T$), the constraint function $g(x, \mathcal{Y})$, and a disturbance term (w) capturing wind and other environmental factors. The second variable in the constraint function $g(x, \mathcal{Y})$ is:

$$\mathcal{Y} = \hslash_{out}(x)$$

The nonlinear output function $\hslash_{out}$ maps state variables into system performance parameters such as (range, speed, look rate, cross polarization angle, etc.). Using system state (x) and output variable ($\mathcal{Y}$), the function $g(x, \mathcal{Y})$ defines constraints that the trajectory must honor for profile validity. Roll ($\phi_C$) and pitch ($\theta_C$) commands are selected to avoid violating constraints to the maximum possible extent.

The MPC optimization problem can be formulated in standard form as follows, where the objective function is to maximize swept look angle over the time range 0 to N:

Maximize $\Delta\lambda$ over 0 . . . N

Subject to $$\dot{x} = f_{dyn}(x, \phi_C, \theta_C, w)$$

$$\mathcal{Y} = \hslash_{out}(x)$$

$$g(x, \mathcal{Y}) \geq 0$$

The function $f_{dyn}$ defines the dynamics of the platform considering state, control, and disturbance inputs. The constraint function $g(x, \mathcal{Y})$ defines both equality and inequality constraints which must be satisfied for profile validity.

As previously described, the DART flight director mapping function calculates roll and pitch error signals to display to the pilot. These error signals can also be used to drive an autopilot system on a manned or unmanned platform. The mapping function $f_{FD}$ maps roll and pitch angle error into flight director error bar positions ($FD_\phi$, $FD_\theta$) to be displayed to pilot:

$$[FD_\phi, FD_\theta] = f_{FD}(\phi_C, \theta_C, x)$$

The $FD_\phi$ term defines the roll error bar position. The $FD_\theta$ term defines the pitch error bar position.

The following derivations describe the calculations for one example implementation of the DART Tier 1 (Error Cue) algorithm.

The state vector required for calculation of the error cue is defined as:

$$x = [Lat_p, Lon_p, Alt_p, \phi_p, \theta_p, \psi_p, Lat_r, Lon_r, Alt_r]^T$$

where [Lat, Lon, Alt] represents the position in latitude, longitude, and altitude. The terms [$\phi$, $\theta$, $\psi$] represent standard notation for attitude with the roll, pitch, and yaw Euler angles. The subscript "p" denotes the airborne platform on which DART is used and the subscript "r" denotes the reference location where the test equipment resides. The superscript "T" represents the vector transpose operator and turns the row vector (as shown) into a column vector.

Next, the [Lat, Lon, Alt] terms are used to create a position vector in an Earth-centered reference frame. Several options are available in current technical literature to include Earth Centered Inertial (ECI) or Earth Centered-Earth Fixed (ECEF), using spherical, ellipsoid (WGS-84), or other geoid models. Another option is to use one of many projection algorithms to transform the [Lat, Lon, Alt] parameters directly into a flat-Earth reference frame. In making the selection of which model to choose, the user should consider the error characteristics inherent to each model and the accuracy requirements of their application.

In the following example, the ECI reference frame is used, where the function $f_{ECI}$ performs the transformation from latitude, longitude, and altitude to [x, y, z] coordinates in the ECI reference frame. The platform position in ECI coordinates is given as:

$$[x_p, y_p, z_p]_{ECI}^T = f_{ECI}(Lat_p, Lon_p, Alt_p)$$

The reference position is similarly defined as:

$$[x_r, y_r, z_r]_{ECI}^T = f_{ECI}(Lat_r, Lon_r, Alt_r)$$

Next, create a vector pointing from the platform to the reference location in ECI coordinates:

$$\vec{r}_{ECI} = [x_r - x_p, y_r - y_p, z_r - z_p]_{ECI}^T$$

To simplify calculations, the preceding vector is normalized to create a unit vector pointing from the platform location to the reference location:

$$\vec{r}_{ECI} / |\vec{r}_{ECI}| = \vec{u}_{ECI} = [u_x, u_y, u_z]_{ECI}^T$$

The next step is to use a transformation matrix (commonly available in technical literature) to transform the unit vector in ECI coordinates to one in Geographic or Local-Level coordinates (also commonly called the North-East-Down (NED) coordinate frame). The 3×3 transformation matrix $B_G$ performs this transformation as:

$$\vec{u}_{NED} = B_G \vec{u}_{ECI}$$

Using the unit vector in NED coordinates, one can use the platform Euler angles ($\phi$, $\theta$, $\psi$) defining attitude as roll, pitch, and yaw, respectively, to transform from NED to body axis coordinates. The body axis reference frame is aligned x-forward, y-right, and z-down on the platform.

Using the Yaw-Pitch-Roll convention for Euler angle transformation, the body axis unit vector is defined as:

$$\vec{u}_{BOD} = B_\phi B_\theta B_\psi \vec{u}_{NED}$$

The B direction cosine transformation matrices are defined below:

$$B_\phi = \begin{bmatrix} 1 & 0 & 0 \\ 0 & \cos(\phi) & \sin(\phi) \\ 0 & -\sin(\phi) & \cos(\phi) \end{bmatrix}$$

$$B_\theta = \begin{bmatrix} \cos(\theta) & 0 & -\sin(\theta) \\ 0 & 1 & 0 \\ \sin(\theta) & 0 & \cos(\theta) \end{bmatrix}$$

$$B_\psi = \begin{bmatrix} \cos(\psi) & \sin(\psi) & 0 \\ -\sin(\psi) & \cos(\psi) & 0 \\ 0 & 0 & 1 \end{bmatrix}$$

To calculate the look and depression angles (defining the function $f_{\lambda,\delta}$ referenced previously), one can use elements of the body axis unit vector as follows:

$$\lambda = \arctan\left(\frac{u_y}{u_x}\right)$$

$$\delta = \arcsin(-u_z)$$

where the x, y and z components are taken from the body axis unit vector $\vec{u}_{BOD}$.

When calculating the look angle $\lambda$, the arctan function should properly resolve x and y components into the proper quadrant based on the sign of the input arguments.

The depression angle target function uses a table lookup defined by vectors of look angle and target depression angle, specified by:

$$\delta_{tgt} = f_{tgt}(\lambda)$$

The depression angle error is defined as the difference between the current depression angle and the target value:

$$\varepsilon = \delta - \delta_{tgt}$$

The function that maps look angle and depression angle error into DART Error Cue position $\theta_{EC}$ is as previously defined. The function performs simple calculations based on a series of if-then-else logical tests to specify the appropriate Error Cue position on the pilot's display.

The following derivations describe the calculations needed to implement the DART Tier 2 (Blended Flight Director) algorithm.

The DART Blended Flight Director algorithm has two primary degrees of freedom, permitting the adjustment of the commanded roll and pitch attitude of the platform, ($\phi_C$, $\theta_C$).

Using the definition of depression angle defined previously, $\delta = a\sin(-u_z)$, one can solve for the target z-component of the body axis unit vector $u_{z,tgt}$ as a function of target depression angle:

$$u_{z,tgt} = -\sin(\delta_{tgt})$$

The general problem to be solved is as follows: Given a NED unit vector $\vec{u}_{NED}$, the current platform yaw Euler angle $\psi$, the NED-to-body transformation previously defined $\vec{u}_{BOD} = B_\phi B_\theta B_\psi \vec{u}_{NED}$, and the target z-component of the body axis unit vector $u_{z,tgt} = -\sin(\delta_{tgt})$, solve for the roll ($\phi_C$) and pitch ($\theta_C$) commands required to satisfy the DART Command Equation (DCE), defined below:

$$-\sin(\delta_{tgt}) = \begin{bmatrix} \sin(\phi_C)\sin(\psi_F) + \cos(\phi_C)\sin(\theta_C)\cos(\psi_F) \\ -\sin(\phi_C)\cos(\psi_F) + \cos(\phi_C)\sin(\theta_C)\sin(\psi_F) \\ \cos(\phi_C)\cos(\theta_C) \end{bmatrix}^T \vec{u}_{NED}$$

where the subscript "C" denotes the free "command" parameters to be solved for $\phi_C$ and $\theta_C$, and the subscript "F" denotes the parameter is "fixed". The superscript "T" denotes the vector transpose and is used to allow a more compact representation of the equation.

The DART Command Equation is a transcendental function with no closed-form algebraic solution when solving for $\phi_C$ and $\theta_C$. A variety of analytical approximations, numerical, and graphical methods are available in the technical literature for the solution of equations in this form.

In solving the above equation, the yaw angle is set and held fixed with the current state value $\psi_F$. The NED unit vector $\vec{u}_{NED}$ is derived based on platform and reference location relative geometry. The target depression angle is defined as a function of look angle, $\delta_{tgt} = f_{tgt}(\lambda)$.

First, consider the solution to the special case where either roll or pitch is fixed, $\phi_F$ or $\theta_F$. In this form, the equation has only a single degree of freedom and the solution can be obtained using a variety of nonlinear solver techniques. A simple Newton's Method secant-slope solver has proven effective in algorithm prototype implementation.

With a single degree of freedom, the user should be careful when fixing either roll or pitch values due to singularities seen with certain relative geometries (e.g., when the look angle $\lambda = 90°$ and the depression angle $\delta = 0°$, a change in pitch input $\theta_C$ has no effect on the resulting depression angle).

Fixing either pitch or roll simplifies the trajectory design process. Profiles designed to use this special case can have fixed roll or pitch for an entire profile, or switch between fixed and free parameters at certain stages of a profile at the user's discretion.

The solution to this special case can be represented by the command function:

$$[\phi_C, \theta_C] = f_{cmd}(x, \lambda_{tgt}, \phi_F, \theta_F)$$

which implements the logic defined above where either $\phi_F$ or $\theta_F$ is an optional argument.

The general solution to the DART Command Equation has two degrees of freedom where the roll and pitch command parameters ($\phi_C$, $\theta_C$) must both be solved to satisfy the equation at every time step k. The solution to the general case will result in an infinite number of solution pairs ($\phi_{Ci}$, $\theta_{Ci}$), where each i-th combination is a unique, feasible solution to the DCE.

To determine the best choice of ($\phi_{Ci}$, $\theta_{Ci}$) to satisfy the DART Command Equation at each time step k, the problem constraints can be considered in the solution.

A set of candidate solutions ($\phi_{Ci}$, $\theta_{Ci}$) is created, where $i = 1, 2, \ldots, N_i$. At time step k, for each candidate solution i, the system dynamics and outputs are given by:

$$x_{k+1,i} = f_{dyn}(x_k, \phi_{Ck,i}, \theta_{Ck,i}, w_k)$$

$$y_{k+1,i} = h_{out}(x_{k+1,i})$$

where the function $f_{dyn}$ represents the nonlinear dynamics propagated from time step k to k+1. The parameters ($\phi_{Ck,i}$, $\theta_{Ck,i}$) represent the solution to the DCE at time step k for the i-th candidate solution. The parameter $w_k$ represents environmental disturbances (wind) at time step k. The function $h_{out}$ calculates nonlinear outputs of the state vector to be considered in the constraint function. Examples of these output parameters are indicated airspeed $V_{IAS}$, horizontal range to the reference location $R_h$, look rate $\lambda$, and cross-polarization angle $\chi$, all nonlinear functions of the state vector $x_k$.

The state vector $x_k$ includes, but is not limited to: position, attitude, linear and angular velocity, and linear and angular acceleration terms.

The output vector $y_k$ includes, but is not limited to: indicated airspeed, range to reference location, look rate, cross-polarization angle, and any other terms relevant to system performance and constraints.

The constraint function $g(x_k, y_k) \geq 0$ can define both equality and inequality constraints which must be satisfied for a valid solution. The elements j=1 to $N_j$ of $g_j(x_k, y_k)$ represent each individual constraint condition. Several sample elements of a constraint equation are given below:

$$g_1(x_k, y_k): \overline{V_{IAS}} - V_{IAS} \geq 0$$

$$g_2(x_k, y_k): V_{IAS} - \underline{V_{IAS}} \geq 0$$

$$g_3(x_k, y_k): \overline{R_h} - R_h \geq 0$$

$$g_4(x_k, y_k): R_h - \underline{R_h} \geq 0$$

The over-bar and under-bar notation represents the maximum and minimum values of the constraint, respectively.

There are several ways that the cost function $J(x_k, y_k, g(x_k, y_k))$ may be constructed to aid in the optimal selection of $(\phi_{Ck}, \theta_{Ck})$. The first two options use distance to the constraint as the primary metric in choosing the optimal value at each time step $(\phi_{Ck}, \theta_{Ck})$. The next two variations use the estimated time to reach a constraint as the primary factor in determining the optimal solution.

Using the "minimax" concept from decision theory, one can choose the i-th candidate solution that yields the largest minimum value across all j constraints of $g_j(x_k, y_k)$. This can be shown as:

$$J_1 = \max_i \left( \min_j (g_j(x_{k,i}, y_{k,i})) \right) \text{ while } g_j(x_{k,i}, y_{k,i}) \geq 0$$

The formulation above maintains the largest margin between each constrained parameter and its respective limit.

An alternative formulation uses the sum of each j constraint multiplied by a user-defined weighting vector $z_g$, to allow prioritization of specific constraints over the range j=1 to $N_j$.

$$J_2 = \max_i \left( \Sigma_{j=1}^{Nj} z_{g,j} g_j(x_{k,i}, y_{k,i}) \right) \text{ while } g_j(x_{k,i}, y_{k,i}) \geq 0$$

The i-th value with the largest weighted sum is selected as the optimal choice.

A third variation of the cost function uses the estimated time to reach a constraint instead of a difference in magnitude between a constrained value and its limit. The estimated time to reach a constraint is given by the vector $T_g$, which can be estimated by the following:

$$T_{g,j} = (a - \underline{a})/\dot{a} \text{ or } T_{g,j} = (\overline{a} - a)/\dot{a}$$

where $T_{g,j}$ is the estimated time to reach the j-th constraint. In general terms, the current value of the constrained parameter is a. The over-bar and under-bar notation represent the maximum and minimum values of the constraint, respectively. The rate of change of the constrained parameter is $\dot{a}$.

Using the minimax approach described above, one can choose the i-th candidate solution that yields the largest minimum estimated time $T_{g,j}$ across all j constraints:

$$J_3 = \max_i \left( \min_j (T_{g,j,i}) \right) \text{ while } g_j(x_{k,i}, y_{k,i}) \geq 0$$

The formulation above maintains the largest minimum time margin to each constraint.

A fourth version combines the estimated time to reach constraints with a user-defined time weighting vector $z_T$, which allows prioritization of time to reach a specific constraint:

$$J_4 = \max_i (\Sigma_{j=1}^{nj} z_{T,j} T_{g,j,i}) \text{ while } g_j(x_{k,i}, y_{k,i}) \geq 0$$

The i-th value with the largest weighted sum of estimated time is selected as the optimal choice.

When selecting $(\phi_C, \theta_C)$ from the set of candidate solutions, the user may choose any of the four cost functions presented above or use a different function to meet specific performance requirements.

The solution to the constrained general case can be represented by the command function:

$$[\phi_C, \theta_C] = f_{cmd}(x, \lambda_{tgt}, g(x, y))$$

When displaying flight director cues to the pilot, the following function calculates position commands for the flight director error bars:

$$[FD_\phi, FD_\theta] = f_{FD}(\phi_C, \theta_C, x)$$

The roll and pitch flight director error bar definitions are given by the following:

$$FD_\phi = \phi_C - \phi$$

$$FD_\theta = \theta_C - \theta$$

The above approaches for selection of the best pitch and roll commands $(\phi_C, \theta_C)$ perform a local optimization at the current time step k. This local optimization does not guarantee optimality of a trajectory over an entire flight profile, but can often provide acceptable performance in practice. For a globally optimal flight profile, the DART Tier 3 (Advanced Flight Director) concept uses a Model Predictive Control (MPC) approach to achieve an efficient trajectory while explicitly avoiding constraints.

The DART Tier 3 Advanced Flight Director is a logical extension of the Blended Flight Director (Tier 2). When using constraints in the Tier 2 implementation, the cost functions used for selection of the optimal attitude commands were represented as linearized approximations at each time step. These linearized representations are valid in the neighborhood of the current time step, but not guaranteed to provide a globally optimal solution. Tier 2 trajectories result in a "best first search", or greedy, approach for trajectory generation.

When seeking improvement over DART Tier 2 capabilities, one should select a control methodology that can approximate a globally optimal solution while generating flight path trajectories which satisfy problem constraints. The primary objective for DART Tier 3 trajectories is to be able to track zero depression angle error over a trajectory in the most efficient manner. The definition of "most efficient" could be interpreted in several ways by the user. The primary measure of efficiency used in the derivation below will be maximizing the swept look angle (the difference between the starting and ending look angles) over the trajectory:

$$\max(|\lambda_0 - \lambda_{N_p-1}|) \approx \max\left(\sum_{k=0}^{N_p-1} \lambda_k \Delta T\right)$$

where $N_p$ is the length of the profile when discretized into $\Delta T$ time segments. $\lambda_k$ represents the average look rate over the k-th time increment. Alternative measures of efficiency could be to minimize the change in total energy, altitude, velocity, etc.

The use of Model Predictive Control (MPC) is a natural fit for the objectives of the Tier 3 algorithm. MPC uses a dynamic or kinematic model to propagate system states forward over a finite time horizon $T_H$, discretized into $N_H$ steps with increment $\Delta T$. At each time step, k=0, ..., $N_{H-1}$, an optimal control $u^*_k$ is defined to optimize the cost function J(.) while honoring constraints g(.) over the time horizon (the cost and constraint functions will be defined in more detail in a subsequent section). The asterisk in $u^*_k$ is used to denote the optimal value over the set of possible controls. During each sampling interval, MPC solves an open loop optimization problem, where the solution provides a sequence of optimal commands. The first element of the optimal command sequence $u^*_k(1)$ is applied as the closed loop control for the current sampling interval. The process then repeats as k advances to k+1 and the time horizon advances by $\Delta T$.

Motivating Example—A simple example is given below to illustrate the merit of solving the DART Tier 3 trajectory generation problem using MPC.

Suppose there exist minimum and maximum range constraints which are to be satisfied over the course of a trajectory surveying a desired depression angle. With identical initial conditions, there are an infinite number of trajectories that may be formed using different control strategies. In the example depicted in FIG. 10, three possible trajectories are shown on a two-dimensional plot, neglecting altitude variation for simplicity.

Figure 10:
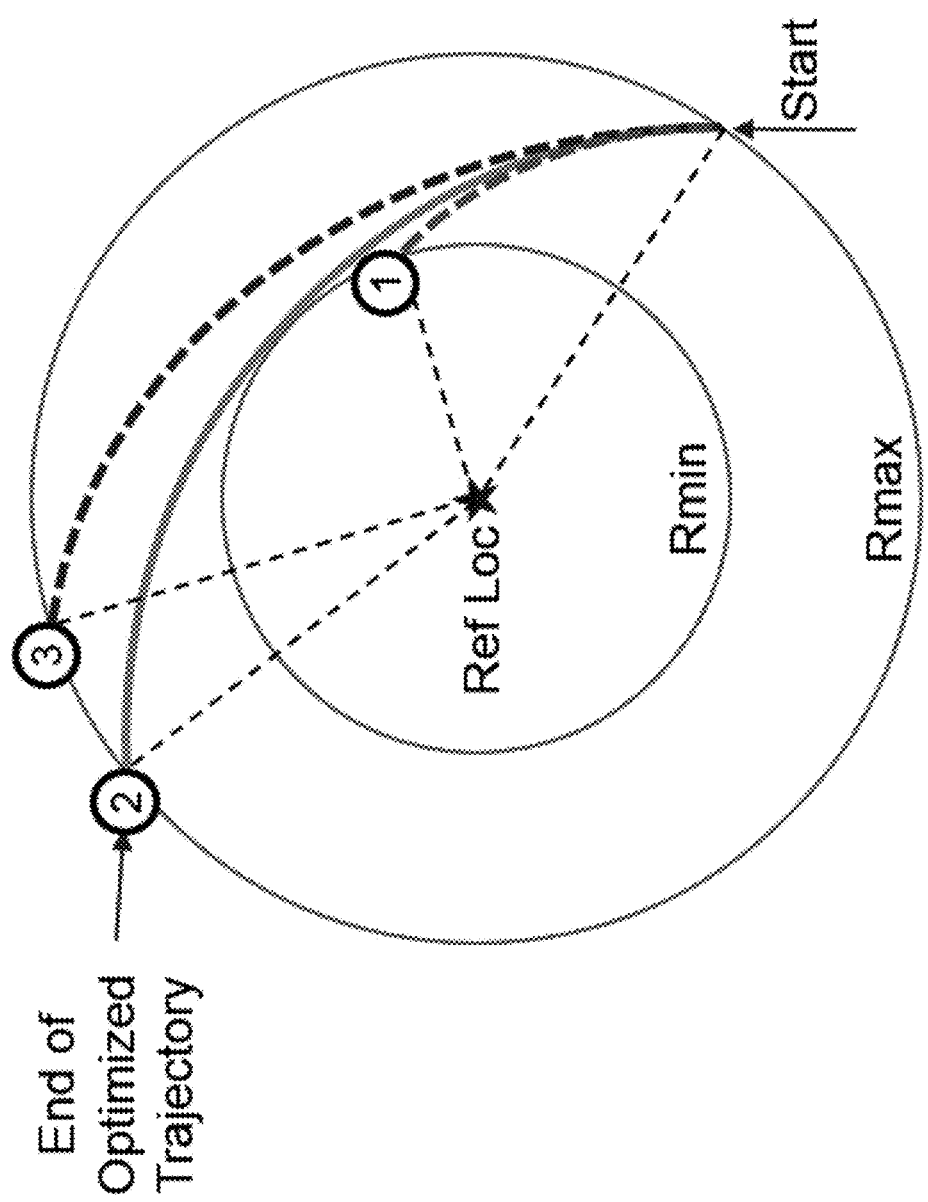
FIG. 10 is a diagram showing three possible trajectories on a two-dimensional plot, neglecting altitude variation for simplicity.

These candidate trajectories start in the same location at a distance $R_{max}$ from the reference location (indicated by "Ref Loc" in FIG. 10). Each uses a slightly different blend of pitch and roll to satisfy the depression angle tracking requirements. Trajectories 1 and 3 represent behaviors that may be expected when using a sub-optimal control scheme. Each of these trajectories prematurely encounters a range constraint, covering a smaller swept look angle range, when compared to the profile in trajectory 2. The optimized profile in trajectory 2 provides a flight path that approaches, but does not violate the minimum range constraint, then proceeds outward toward the maximum range constraint, covering a larger swept look angle than either of the other candidate trajectories.

Model Predictive Control possesses the unique capability to look-ahead, ensuring that control decisions made early in a flight profile do not prematurely violate a constraint within the finite time horizon. By nature of the problem, a flight profile will terminate when reaching one of the constraints (altitude, range, velocity, etc.). The goal of the optimization is to survey the largest look angle segment prior to reaching the terminal constraint at the end of the profile.

Model Predictive Control (also commonly referred to as Receding Horizon Control) is an extension of optimal control theory and was first formulated in the early 1960s. Initial application was limited due to the lack of sufficient computational power to execute the MPC algorithms in a real-time environment. As computing power increased, MPC was applied to industrial process control and petroleum refinement applications. The time scale of these systems was slow enough that there was adequate time for the MPC algorithms to converge to an optimal solution at each sampling interval. More recently, the automotive and aerospace industries have begun adopting MPC algorithms, taking advantage of powerful modern processors to realize the unique constraint handling capabilities of the approach. MPC is an active area of research in academia and industry. As such, dozens of variations and extensions of the initial linear MPC concepts have been developed. These include linear, nonlinear, and hybrid versions, approaches that are tailored for fast real-time operation, and variants that allow for robust tracking and stabilization of unstable systems.

The constraint handling qualities of the MPC approach are key to its use in many applications. Many cost functions used in optimal control theory allow the designer to penalize deviation from a reference state or excessive control usage. These methods do not allow for explicit handling of equality and inequality constraints. As seen in many applications, operation near constraints is not necessarily undesirable. For the petroleum refinery application, operation at or near multiple constraints can improve product yield, increasing efficiency and economic benefit.

The application of MPC for DART Tier 3 algorithms leverages these constraint avoidance properties to maximize the efficiency of flight profiles. The nature of the kinematic models and constraints used in the DART problem necessitate that one use a nonlinear variant of MPC (NMPC). For DART, the specifics of implementation for the NMPC solver are flexible and therefore treated as a black-box used within the DART algorithms. There are numerous commercially available nonlinear MPC solvers from which to choose. Alternatively, one may choose to develop a customized MPC algorithm, tailored for the specifics of the DART application and host processor.

In setting up the input parameters for a nonlinear MPC problem, the primary requirements are the definition of a nonlinear dynamic (or kinematic) model, the selection of cost function, the definition of constraints, and the choice of prediction horizon.

Choice of Dynamic Model—A hybrid, nonlinear kinematic model may be used in lieu of a full nonlinear dynamic model. This hybrid, nonlinear model captures the dominant effects for a point-mass moving through space subject to the kinematic constraints of a bank-to-turn platform. The basic kinematics are augmented by a model of the aerodynamic angle-of-attack, which relates the platform velocity vector to the body axes, and an acceleration model which captures the achievable velocity vector acceleration as a function of speed, altitude, and attitude. The model should be able to accept an estimate of winds aloft as these can be a significant factor in the evolution of a flight profile. This model, which propagates the state from k to k+1 is given by the notation below:

$$x_{k+1} = f_{dyn}(x_k, \phi_{Ck}, \theta_{Ck}, w_k)$$

Choice of Constraints—The constraints used in the MPC solution are the same as those presented in the Tier 2 problem statement, with the addition of the optimal control $u^*_k$ given by the MPC algorithm. The constraint function $g(x_k, y_k, u^*_k) \geq 0$ is to be satisfied at each time step. Again, $x_k$ represents the system state and $y_k$ represents a vector of (possibly nonlinear) model outputs which are a function of system state. In general form, the constraints can be shown as:

$$\underline{x} \leq x_k \leq \overline{x}$$

$$\underline{y} \leq y_k \leq \overline{y}$$

$$\underline{u} \leq u^*_k \leq \overline{u}$$

where the under-bar and over-bar notation represent lower and upper limits, respectively.

Choice of Cost Function—A common, but flexible choice in cost function definition is a weighted quadratic sum, $$J(z) = \sum_{k=0}^{N_H-1} z_k^T Q z_k$$

where $z_k$ represents a vector of quantities subject to penalization over $N_H$ steps and the superscript T denotes the vector transpose operator. Q is a symmetric, positive semi-definite matrix, allowing the user to specify non-negative relative weights for each element of $z_k$. In the DART application, the cost function $J(z)$ is to be maximized over the set of possible controls u.

In the simplest form where maximizing swept look angle is the only objective, the cost function reduces to $$J(\lambda) = \sum_{k=0}^{N_H-1} (\dot{\lambda}_k \Delta T)^2$$

In the generalized definition, the elements of $z_k$ are a combination of model states, outputs, controls, and constraint limits, and are defined by (but not limited to) the following:

$$z_k = [\dot{\lambda}_k \Delta T, x_k - \overline{x}, x_k - \underline{x}, y_k - \overline{y}, y_k - \underline{y}, u^*_k - \overline{u}, u^*_k - \underline{u}, \dots]^T$$

where $\dot{\lambda}_k \Delta T$ is the look angle swept at time step k, and the remaining terms represent the vector difference between the state, output, and control vectors, and their respective upper and lower constraint limits (when applicable).

Choice of Time Horizon—The initial selection of finite time horizon $T_H$ should be long enough to allow the optimal trajectory to run into a terminal constraint, ending the profile. As the trajectory evolves with each step of the MPC algorithm, computational efficiency can be gained by updating the time horizon to match the expected end of profile.

Figure 11:
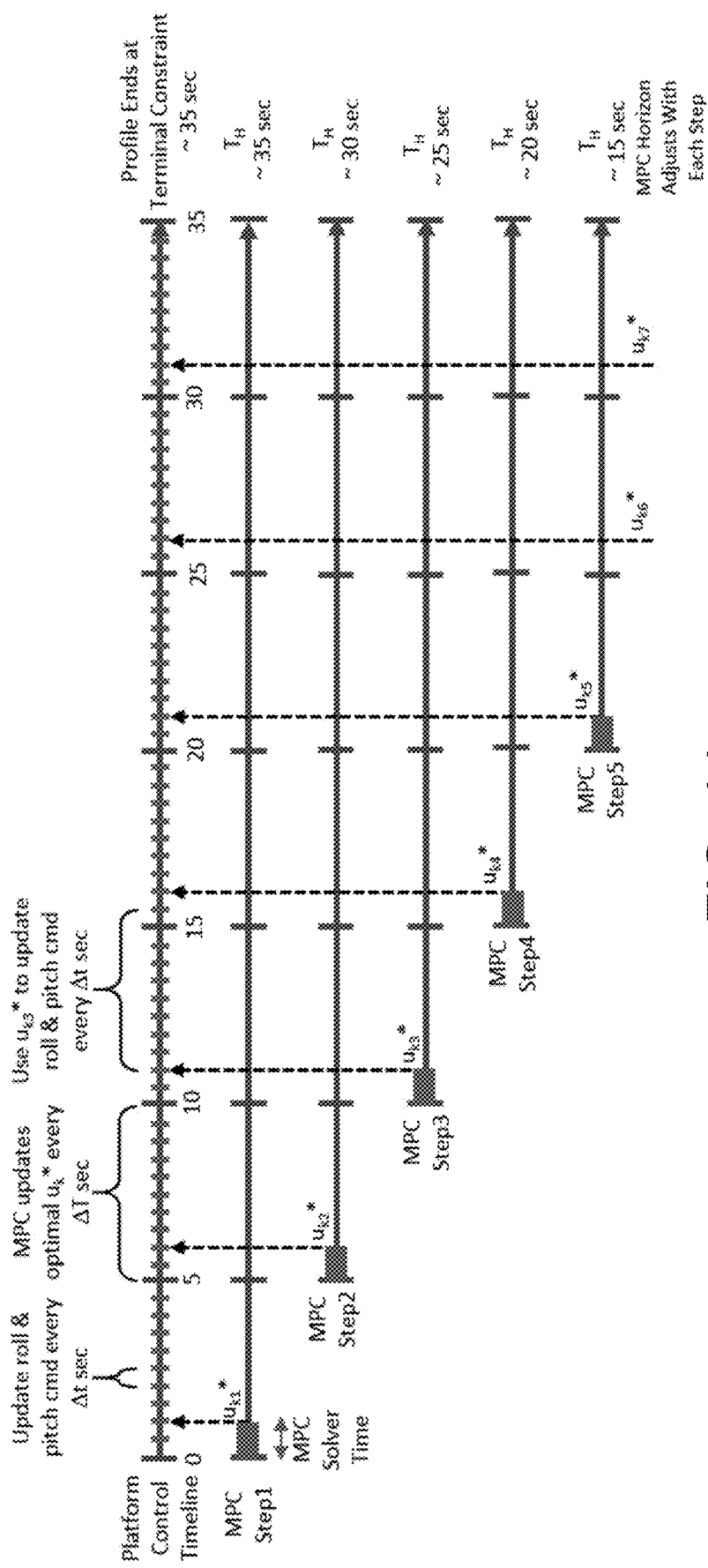
FIG. 11 is a chart showing a notional example of Model Predictive Control and control timing.

Time Scale Separation—For smooth tracking of the target depression angle, the roll and pitch commands must be updated with a sufficiently small time increment $\Delta t$. The processing time required for the MPC solver may exceed this small time increment, so formulating the algorithm using time scale separation is preferred. The implementation of DART Tier 3 will preferably accommodate multiple time scales, where the MPC solution is calculated every $\Delta T$ seconds and the roll and pitch commands will be calculated every $\Delta t$ seconds, where $\Delta t \leq \Delta T$. A notional example of MPC and control timing is shown in FIG. 11.

Choice of Model Predictive Control Parameter—The use of time scale separation in the implementation of the Tier 3 algorithm influences the choice of control parameter $u^*_k$ provided by the MPC solution. Since the roll and pitch commands ($\phi_C$, $\theta_C$) are related by the DART Command Equation defined for Tier 2, an optimal set of commands ($\phi^*_C$, $\theta^*_C$) may be obtained by defining either of the command parameters.

If the MPC algorithm's optimal control parameter at time step k is defined as a Euler angle rate $\dot{\phi}^*_k$ or $\dot{\theta}^*_k$, then the optimal roll or pitch command for step k can be calculated at any time within the interval $\Delta T$. To avoid singularities in the DART Command Equation, the selection of $\dot{\phi}^*_k$ or $\dot{\theta}^*_k$ is based on the look angle sector as defined below:

$$u^*_k = (\dot{\phi}^*_k \text{ or } \dot{\theta}^*_k) = \begin{cases} \dot{\phi}^*_k, & 0° \leq |\lambda| < 45° \text{ (Nose Sector)} \\ \dot{\theta}^*_k, & 45° \leq |\lambda| < 135° \text{ (Side Sectors)} \\ \dot{\phi}^*_k, & 135° \leq |\lambda| \leq 180° \text{ (Tail Sector)} \end{cases}$$

where $\lambda \in [-180°, 180°]$.

The optimal commands ($\phi^*_C$, $\theta^*_C$) at each interval $\Delta t$ are shown below:

Nose/Tail Sector:

$$\phi^*_{C,k} = \phi^*_{C,k-1} + \dot{\phi}^*_k \Delta t$$

$$\theta^*_{C,k} = f_{DCE}(x_k, \phi^*_{C,k})$$

Side Sectors:

$$\theta^*_{C,k} = \theta^*_{C,k-1} + \dot{\theta}^*_k \Delta t$$

$$\phi^*_{C,k} = f_{DCE}(x_k, \theta^*_{C,k})$$

where $f_{DCE}(.)$ is the solution to the DART Command Equation (defined in Tier 2) when specifying either roll or pitch.

Figure 12:
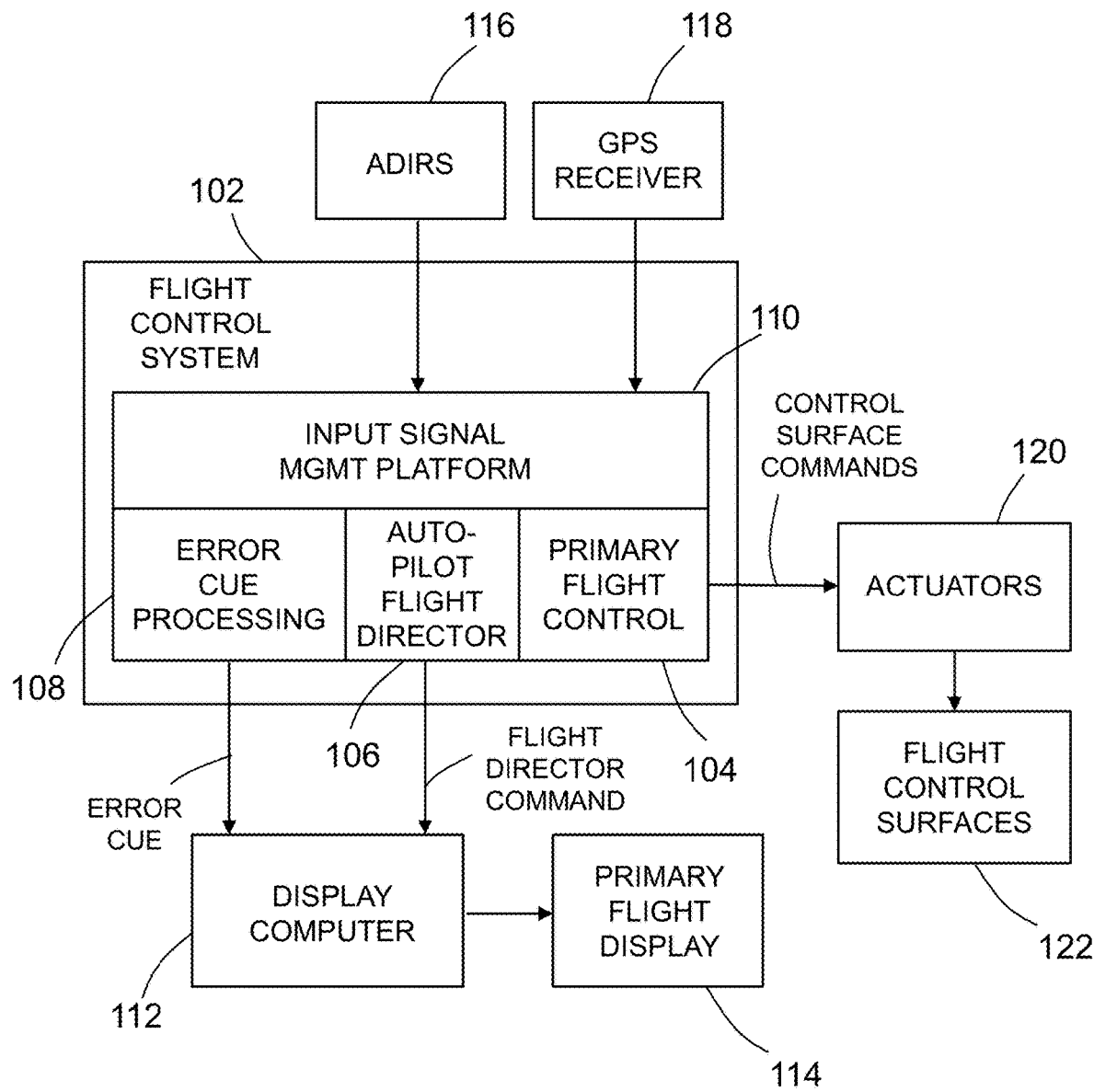
FIG. 12 is a block diagram identifying some components of an aircraft having a depression angle reference tracking system in accordance with one embodiment.

In accordance with one embodiment, the algorithm flow for the DART Tier 3, i.e., Advanced Flight Director, logic is as follows:

(1) Call nonlinear MPC solver with state, $x_k$
(2) Get optimal rate command $u^*_k = (\dot{\phi}^*_k$ or $\dot{\theta}^*_k)$ to use over next $\Delta T$ seconds
    (a) For each $\Delta t$ from $t=0, \dots, \Delta T$
        (i) Use optimal rate command $\dot{\phi}^*_k$ or $\dot{\theta}^*_k$ to select commanded attitude $\phi^*_{C,k}$ or $\theta^*_{C,k}$
        (ii) Use DCE to solve for corresponding attitude command
        (iii) Provide attitude commands to flight director
        (iv) Repeat (a) until reaching $\Delta T$
(3) Repeat (1) until reaching end of profile at terminal constraint FIG. 12 is a block diagram identifying some components of an aircraft having a flight control system 102 in accordance with one embodiment. The flight control system 102 comprises one or more computers that perform the following functions: primary flight control function 104, autopilot flight director 106 (as described in detail above) and error cue processing 108 (as described in detail above). However, this architecture is presented for illustrative purposes only. All of the DART algorithm functionality (error cue processing, flight director calculations, etc.) could be hosted on a wide range of onboard computing systems. Different airborne platforms will have different computing system architectures. Some elements of an existing architecture will be more expensive to retrofit with DART functionality than others. For example, the DART algorithm functionality could be hosted on an integrated flight computer, a mission computer, a display processor, or external computing and display hardware that is not an original part of a platform's existing flight/mission systems architecture (provided that the external hardware has access to precise position and attitude data from the platform).

The autopilot flight director 106 comprises various avionic components (not shown) including (but not limited to) an autopilot system and a flight director system. The autopilot system is capable of initiating movement of the various aircraft control surfaces by providing guidance signals to the primary flight control function 104. The flight director system provides an electronic display of roll and pitch guidance commands to the pilot for use while flying the aircraft during manual flight. The flight director system communicates with a display computer 112 which is configured to control a primary flight display 114 (or other cockpit display). In response to the data received from error cue processing 108, the display computer 112 controls the primary flight display 114 to display symbology similar to what is depicted in FIGS. 3 and 4, while in response to the data received from the auto-pilot flight director 106, the display computer 112 controls the primary flight display 114 to display symbology similar to what is depicted in FIGS. 6 and 7. In the case of the notional symbology shown in FIGS. 6 and 7, the primary flight display 114 graphically depicts the aircraft attitude relative to the horizon (by means of a fixed aircraft symbol 26 and a moving horizon line 22), a roll angle error bar 30 and a pitch angle error bar 32. The displayed information dynamically changes in response to changes in aircraft parameter values. Display computers are well-known in the art and the basic operation of display computer 112 will not be described in detail herein. Alternatively, the relevant functions of the flight control system 102 and display computer 112 could be performed by a single computer having a single processor or multiple processors.

The flight control system 102 further comprises an input signal management platform 110 that receives signals representing flight parameter data from an air data inertial reference system (ADIRS) 116 and GPS signals from a GPS receiver 118 (the antenna by which the GPS receiver 118 receives GPS signals is not shown in FIG. 8). The ADIRS 116 comprises an air data part that provides airspeed, angle of attack, temperature and barometric altitude data, and an inertial reference part that provides attitude, flight path vector, ground speed and positional data to the input signal management platform 110. The GPS signals can be processed to determine the coordinates of the location of the aircraft.

Although not shown in FIG. 12, one typical primary cockpit flight control input device is a control yoke or stick that governs the aircraft's roll and pitch by moving the ailerons when turned or deflected left and right and moving the elevators when moved backwards or forwards. In addition, the primary flight control function 104 comprises a roll rate command system which is responsive to commands from the aircraft pilot. The commanded roll rate is inputted by the pilot by moving the control yoke or stick. During rolling of the aircraft, the roll rate is measured by a roll rate gyroscope contained in the ADIRS 116. This measured roll rate is compared to the commanded roll rate. The primary flight control function 104 then outputs control surface commands to the electro-hydraulic servo actuators 120, which commands are a function of the difference between the measured and commanded roll rates. In response to the control surface commands, the electro-hydraulic servo actuators 120 deflect a pair of flight control surfaces 122 (e.g., ailerons) in opposite directions to induce rolling. The primary flight control function 104 also controls pitch and yaw.

A benefit of flying precise relative geometries (depression angle tracking) can be seen when considering the assessment of systems onboard an airborne sensor platform. One such airborne sensor platform can be outfitted with numerous sensor systems with capabilities across a broad range of the electromagnetic spectrum. The primary sensor on this platform may be a large side-looking phased array radar mounted on the underside of the aircraft. The primary regions of coverage for the radar aperture are to the left and right of the aircraft centerline. In this case the under-wing mounted engine nacelles can mask the radar aperture line-of-sight at shallow depression angles, either blocking or distorting the RF propagation toward the intended target.

Characterizing aperture performance in the presence of structural or other spatial interference is one of the key applications of the DART system. To accurately characterize the masking effects in the example above, the test team could fly profiles to gather depression angle data over a range of values (e.g., −10°, −8°, −6°, etc.). By either sending (or receiving) a reference signal of known power, polarization, and phase to (or from) the test equipment at the reference location, the test team can solve for the aperture gain and other unknown parameters. Having the ability to fly precise relative geometries allows the measured data to be precisely mapped into the aircraft coordinate frame. Measured aperture performance is critical in accurately modeling and exploiting the performance of a sensor system.

The DART algorithm and display concepts provide a means to fly precise relative geometries with respect to a stationary (or mobile) reference location. The desired relative geometries are often defined as target the depression angle as a function of look angle, where the target depression angle may be constant or variable as look angle changes.

Other uses for the DART systems and methods disclosed herein include:

Verification and Validation—Once baseline system performance expectations have been established, a new production unit or a system returning from maintenance may be required to fly a series of flight profiles to validate that specification compliance is still satisfied and to verify overall performance is in-family with previous testing. The DART system provides the ability to fly repeatable profiles through the same depression angles, allowing for close comparison with previous testing.

Diagnostic and Calibration Capabilities—the DART system's ability to facilitate precise, repeatable, relative geometries allows for flight profiles to be used for diagnostic and calibration purposes. If a sensor system is underperforming, in-flight performance assessment may be a valuable tool in identifying and quantifying problem areas, providing insight into what other flight or ground-based diagnostics should be pursued. By flying a series of sensor profiles to survey a fine range of depression and look angle combinations, aperture beam pointing, side-lobe, and back-lobe data may be made available for system sensitivity assessment and calibration.

While systems and methods for tracking a target depression angle relative to a reference location have been described with reference to various embodiments, it will be understood by those skilled in the art that various changes may be made and equivalents may be substituted for elements thereof without departing from the scope of the teachings herein. In addition, many modifications may be made to adapt the teachings herein to a particular situation without departing from the scope thereof. Therefore it is intended that the claims not be limited to the particular embodiments disclosed herein.

The methods described herein may be encoded as executable instructions embodied in a non-transitory tangible computer-readable storage medium, including, without limitation, a storage device and/or a memory device. Such instructions, when executed by a processing or computing system, cause the system device to perform at least a portion of the methods described herein.

As used in the claims, the term "computer system" should be construed broadly to encompass a system having at least one computer or processor, and which may have multiple computers or processors that communicate through a network or bus. As used in the preceding sentence, the terms "computer" and "processor" both refer to devices comprising a processing unit (e.g., a central processing unit, an integrated circuit or an arithmetic logic unit).

As used herein, the term "location", as applied to an aircraft, comprises position in a fixed three-dimensional coordinate system and orientation relative to that coordinate system. As used herein, the phrase "reference location" means a reference point having position coordinates.

The process claims set forth hereinafter should not be construed to require that the steps recited therein be performed in alphabetical order (any alphabetical ordering in the claims is used solely for the purpose of referencing previously recited steps) or in the order in which they are recited unless the claim language explicitly specifies or states conditions indicating a particular order in which some or all of those steps are performed. Nor should the process claims be construed to exclude any portions of two or more steps being performed concurrently or alternatingly unless the claim language explicitly states a condition that precludes such an interpretation.

The invention claimed is:

1. A system for displaying an indicator that indicates a look angle and a magnitude of a depression angle error to a pilot of an aircraft in flight, the system comprising:
    a display unit having a display screen;
    systems for acquiring data representing a location of an aircraft; and
    a computer system configured to perform operations comprising:
        (a) calculating a location of the aircraft using the data acquired by the systems;
        (b) generating a body reference vector, relative to a frame of reference (XYZ) of a body of the aircraft, indicating the location of the aircraft relative to a reference location;
        (c) calculating a look angle, representing an azimuth between a longitudinal axis (X) of the body of the aircraft and a line-of-sight vector pointing at the reference location, and a depression angle, representing an angle between the line-of-sight vector and the X-Y plane of the body of the aircraft, using the body reference vector;
        (d) calculating a depression angle error based on a deviation of the depression angle calculated in operation (c) from a target depression angle;
        (e) mapping the depression angle error and the look angle into vertical and lateral positions respectively of an error cue; and
        (f) controlling the display unit to display the error cue having a lateral position on the display screen which is a function of the look angle and having a vertical position on the display screen which is a function of the depression angle error.

2. The system as recited in claim 1, wherein the target depression angle varies as a function of a look angle.

3. The system as recited in claim 1, wherein the computer system is further configured to control the display unit to display on the display screen a horizon line representing a horizon relative to the aircraft and a second symbol representing a position and orientation of the aircraft relative to the horizon, wherein the position of the second symbol on the display screen is fixed.

4. The system as recited in claim 1, wherein the computer system is further configured to control the display unit to display on the display screen at least a portion of a reference line, wherein the first symbol is centered on the reference line when the depression angle error is zero.

5. The system as recited in claim 1, wherein the systems for acquiring data representing the location of the aircraft comprise a global positioning system and an inertial navigation system.

6. A method for displaying an indicator that indicates a look angle and a magnitude of a depression angle error to a pilot of an aircraft in flight, the method comprising:
    (a) acquiring data representing a location of an aircraft;
    (b) calculating a location of the aircraft using the acquired data;
    (c) generating a body reference vector, relative to a frame of reference (XYZ) of a body of the aircraft, indicating the location of the aircraft relative to a reference location;
    (d) calculating a look angle, representing an azimuth between a longitudinal axis (X) of the body of the aircraft and a line-of-sight vector pointing at the reference location, and a depression angle, representing an angle between the line-of-sight vector and the X-Y plane of the body of the aircraft, using the body reference vector;
    (e) calculating a depression angle error based on a deviation of depression angle calculated in step (d) from a target depression angle;
    (f) mapping the depression angle error and the look angle into vertical and lateral positions respectively of an error cue; and
    (g) displaying an error cue on a display screen of a display unit, which error cue has a lateral position on the display screen which is a function of the look angle and a vertical position on the display screen which is a function of the depression angle error.

7. The method as recited in claim 6, further comprising:
    displaying a reference line on the display screen corresponding to a deviation equal to zero;
    viewing the display screen as the error cue and the reference line are being displayed; and
    manipulating a primary cockpit flight control input device in a manner that causes the error cue to move closer to the reference line,
    wherein the depression angle error is zero when the error cue is centered on the reference line.

8. The method as recited in claim 6, wherein the reference location is moving.

9. The method as recited in claim 6, wherein the target depression angle varies as a function of a look angle.

10. A system for displaying visual cues for pilot guidance during flight of an aircraft, the system comprising:
    a display unit having a display screen;
    systems for acquiring data representing a location of an aircraft; and
    a computer system configured to perform operations comprising:

(a) retrieving data specifying a target depression angle of the aircraft as a function of a look angle of the aircraft;
(b) calculating a location of the aircraft using the data acquired by the systems;
(c) generating a body reference vector, relative to a frame of reference (XYZ) of a body of the aircraft, indicating the location of the aircraft relative to a reference location;
(d) calculating a look angle, representing an azimuth between a longitudinal axis (X) of the body of the aircraft and a line-of-sight vector pointing at the reference location, and a depression angle, representing an angle between the line-of-sight vector and the X-Y plane of the body of the aircraft, using the body reference vector;
(e) calculating a depression angle error based on a deviation of the depression angle calculated in operation (d) from the target depression angle;
(f) calculating optimal roll and pitch steering commands that satisfy the condition that the depression angle error equals zero;
(g) calculating roll and pitch angle errors representing respective deviations of current roll and pitch steering commands from the optimal roll and pitch steering commands; and
(h) controlling the display unit to display roll and pitch error bars on the display screen, wherein the positions of the roll and pitch error bars are respective functions of the calculated roll and pitch angle errors.

11. The system as recited in claim 10, wherein the computer system is further configured to perform an autopilot function that is driven by the calculated roll and pitch angle errors.

12. The system as recited in claim 10, wherein the computer system is further configured to calculate the optimal roll and pitch steering commands by executing the following operations:
normalizing the body reference vector to create a location unit vector that points from an aircraft location to a reference location;
solving for a target Z-component of a body axis unit vector as a function of the target depression angle;
creating a set of candidate solutions for roll and pitch steering commands that satisfy a command equation in which the target Z-component of the body axis unit vector is a transcendental function of at least the location unit vector and the roll and pitch steering commands; and
using a cost function to select the optimal roll and pitch steering commands from the set of candidate solutions.

13. The system as recited in claim 12, wherein the computer system performs a linearization of constraints using the cost function to blend the optimal roll and pitch steering commands.

14. The system as recited in claim 10, wherein the optimal roll and pitch steering commands are calculated using a Model Predictive Control approach for real-time trajectory optimization while honoring constraints.

15. The system as recited in claim 10, wherein the computer system is further configured to control the display unit to display on the display screen a horizon line representing a horizon relative to the aircraft, at least a portion of a reference line, and an aircraft symbol representing a position and orientation of the aircraft relative to the horizon; the position of the aircraft symbol on the display screen is fixed; and an intersection of the roll and pitch error bars will be centered on the aircraft symbol when the roll and pitch angle errors equal zero.

16. The system as recited in claim 10, wherein the systems for acquiring data representing the location of the aircraft comprise a global positioning system and an inertial navigation system.

17. A method for providing guidance to enable a pilot flying an aircraft to track a target depression angle, the method comprising:
(a) acquiring data representing a location of an aircraft;
(b) retrieving data specifying a target depression angle of the aircraft as a function of a look angle of the aircraft;
(c) generating a body reference vector, relative to a frame of reference (XYZ) of a body of the aircraft, indicating the location of the aircraft relative to a reference location;
(d) calculating a look angle, representing an azimuth between a longitudinal axis (X) of the body of the aircraft and a line-of-sight vector pointing at the reference location, and a depression angle, representing an angle between the line-of-sight vector and the X-Y plane of the body of the aircraft, using the body reference vector;
(e) calculating the look angle and a depression angle using the body reference vector;
(f) calculating a depression angle error based on a deviation of the depression angle calculated in operation (d) from the target depression angle;
(g) calculating optimal roll and pitch steering commands that satisfy the condition that the depression angle error equals zero;
(h) calculating roll and pitch angle errors representing respective deviations of current roll and pitch steering commands from the optimal roll and pitch steering commands; and
(i) displaying roll and pitch error bars on a display screen of a display unit, wherein the positions of the roll and pitch error bars are respective functions of the calculated roll and pitch angle errors.

* * * * *